(12) United States Patent
Yoshida

(10) Patent No.: US 7,962,732 B2
(45) Date of Patent: Jun. 14, 2011

(54) INSTRUCTION PROCESSING APPARATUS

(75) Inventor: Toshio Yoshida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/654,159

(22) Filed: Dec. 11, 2009

(65) Prior Publication Data

US 2010/0095095 A1 Apr. 15, 2010

Related U.S. Application Data

(63) Continuation of application No. PCT/JP2007/062424, filed on Jun. 20, 2007.

(51) Int. Cl.
*G06F 9/48* (2006.01)
*G06F 9/52* (2006.01)

(52) U.S. Cl. .............................. 712/228; 712/220

(58) Field of Classification Search .................. 712/220, 712/228
See application file for complete search history.

(56) References Cited

U.S. PATENT DOCUMENTS

| | | | | |
|---|---|---|---|---|
| 5,742,822 A * | 4/1998 | Motomura | ............... | 718/102 |
| 5,933,627 A * | 8/1999 | Parady | .................. | 712/228 |
| 7,146,489 B2 * | 12/2006 | Dowling | ................. | 712/207 |
| 2003/0191927 A1 * | 10/2003 | Joy et al. | ................. | 712/228 |
| 2004/0030873 A1 * | 2/2004 | Park et al. | ................. | 712/245 |
| 2006/0020776 A1 | 1/2006 | Yoshida | | |
| 2006/0026594 A1 | 2/2006 | Yoshida et al. | | |
| 2007/0067612 A1 | 3/2007 | Kan et al. | | |

FOREIGN PATENT DOCUMENTS

| | | |
|---|---|---|
| EP | 1 622 000 | 2/2006 |
| EP | 1 622 003 | 2/2006 |
| EP | 1 768 020 | 3/2007 |
| JP | 2006-039815 | 2/2006 |
| JP | 2006-040141 | 2/2006 |
| JP | 2007-087108 | 4/2007 |

OTHER PUBLICATIONS

International Search Report was issued on Sep. 18, 2007 in corresponding PCT Application No. PCT/JP2007/062424.
English Translation of the International Preliminary Report on Patentability and Written Opinion mailed Jan. 21, 2010 and issued in corresponding International Patent Application PCT/JP2007/062424.

* cited by examiner

*Primary Examiner* — Daniel Pan
(74) *Attorney, Agent, or Firm* — Fujitsu Patent Center

(57) ABSTRACT

An instruction processing apparatus includes a thread execution processing section executing threads each including plural instructions, a register file including a register window having plural registers, a current window pointer indicating a position of the register where the register window is possible to be inputted and outputted, a current register reading data held by the register window designated by the current window pointer to hold the data and a replacement buffer holding data transferred from the register file to the current register, a first transfer path transferring data in a register file to one of the replacement buffer, a second data transfer transferring data in a replacement buffer to one of the current registers, a calculation section executing a switching instruction of the register window, and a control section controlling, if the calculation section executes the switching instruction, the first data transfer path and the second data transfer path.

10 Claims, 19 Drawing Sheets

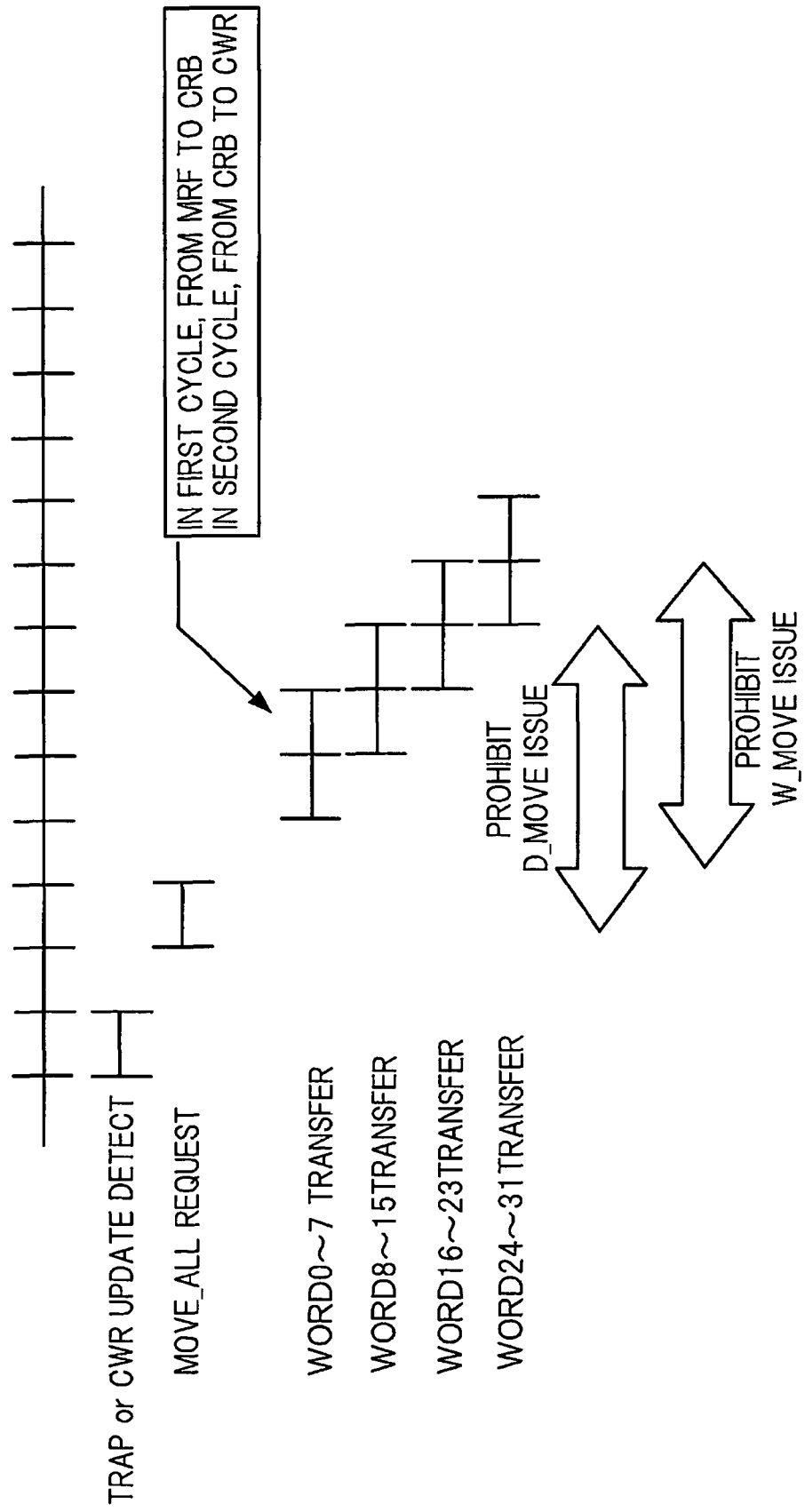

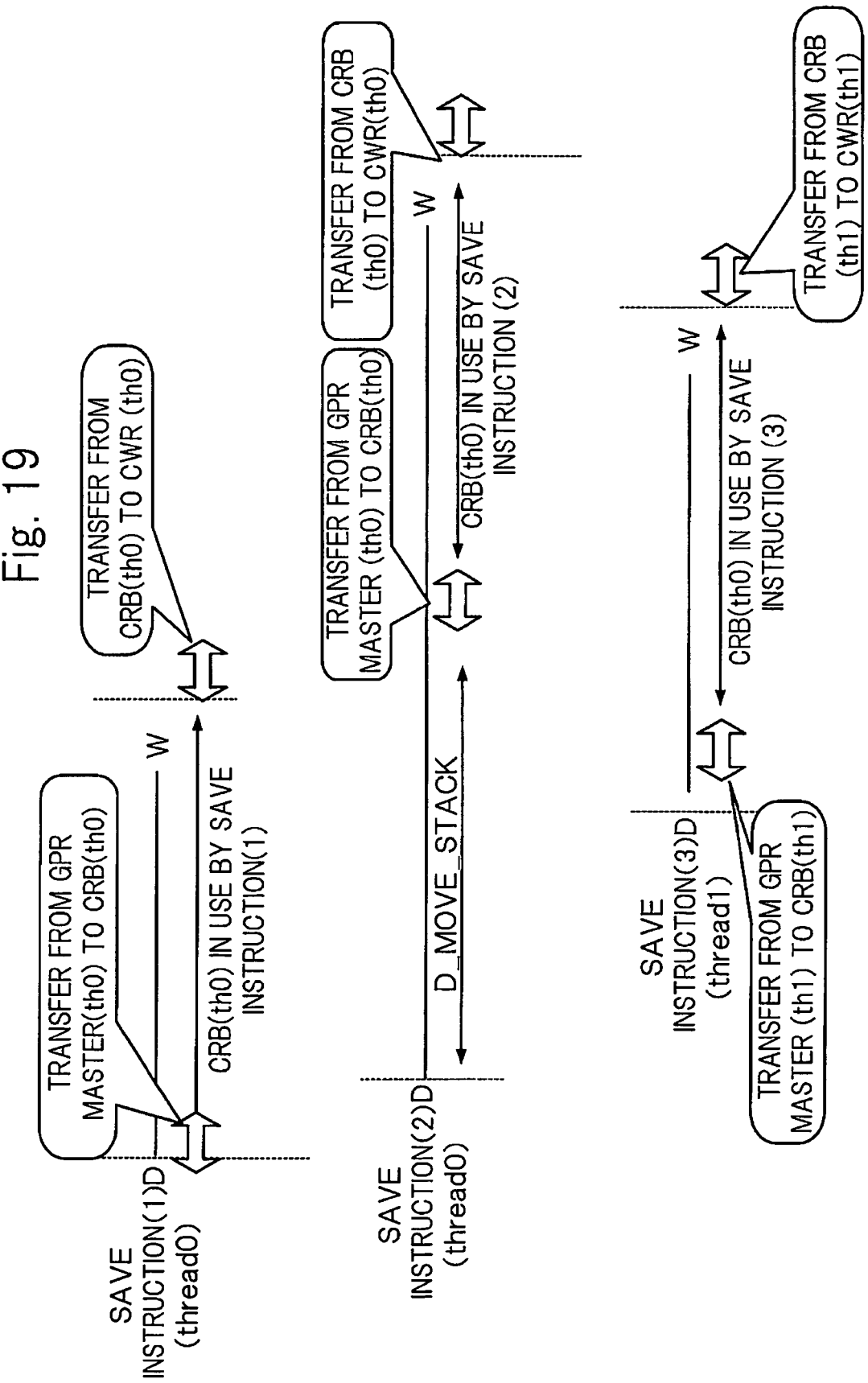

INSTRUCTION PROCESSING APPARATUS

This is a continuation application of PCT/JP2007/062424, filed on Jun. 20, 2007.

TECHNICAL FIELD

The present invention relates to an instruction processing apparatus including a multithreading function to execute plural threads simultaneously.

BACKGROUND ART

Instructions included in a program are processed through a series of stages, such as instruction fetch (fetch), instruction decode (decode), instruction execution and execution result commit (commit), in an instruction processing apparatus typified by a CPU. Conventionally, there has been known a technique called pipeline where CPU resources are allocated for each of instructions in a timesharing manner to perform processing. By applying the pipeline, it is possible to perform a parallel processing while an instruction is executed, for example, to decode a next instruction and to fetch a second next instruction. And in addition, an instruction execution itself is performed through the pipeline, so that it is possible to enhance a processing speed in the instruction processing apparatus.

In recent years, a superscalar system where the pipelines described above are provided in plural to further enhance the speed has been widely used. In addition, out-of order execution where if a condition to execute an instruction is satisfied, the instruction may be executed without following a program order of the instruction has been applied.

FIG. 1 is a diagram explaining a concept of out-of order execution in a superscalar system.

FIG. 1 illustrates an example in which four instructions included in a program are processed by out-of-order execution. Each of the instructions is processed through four stages of fetch (step S501), decode (step S502), execution (step S503) and commit (step S504). Fetch (step S501), decode (step S502) and commit (step S504) are executed in an predetermined order for the four instructions (in-order), and instruction execution of the instruments whose condition (step S503) is first prepared is first performed regardless of a program order (out-of-order).

To achieve out-or-order execution illustrated in FIG. 1, in execution processing (step S503) where plural instructions are executed in parallel, data to be used in those instructions is required to be held without being overwritten. In an instruction processing apparatus employing out-of-order execution of a superscalar system, there is a case where plural data storage places (hereinafter, the storage places each is referred to as register window) connected in a ring form is switched to be used.

FIG. 2 is a conceptual diagram of a register file including plural register windows.

The register file A includes eight register windows W0-W7. The register window being currently used (in FIG. 2, first register window W1) is pointed by a CWP (Current Window Pointer). In the example of FIG. 2, each of the register windows W0-W7 includes 32 registers. Eight registers of the 32 registers are all used as a global area common in the register windows W0-W7, 24 registers out of the 32 registers are divided into three areas of an in-area, a local-area and out-area, eight registers each.

For example, in the register window W1 surrounded by a bold line, an in1 area on the left end overlaps an out0 area of the register window W0 which is one before the window and the in1 area also functions as the out0. In addition, a local1 area in the center does not overlap other window and the register window W1 occupies the local1 area. An out1 area on the right end overlaps an in2 area of the register window W2 which is one after the window W1 and is used commonly by the register windows W1 and W2.

When a SAVE instruction to increment the CWP, a RESTORE instruction to decrement the CWP and a CWP update instruction to move the CWP to an arbitrary position or a trap is issued, the CWP moves according to the instruction so that the register window is switched.

Here, because the register file A has a number of registers, it takes mach time of processing to search a register window which the CWP points every time an instruction is received. Therefore, by providing a work register in which a part of the register file A is copied separately from the register file A as a master file having all the registers, processing time required for searching a register is reduced. Patent document 1 describes an instruction processing apparatus in which a general purpose register (GPR: General Purpose Register) including a replacement buffer (CRB: Current Window Replace Buffer) storing a copy of a register window adjacent to a current register window, in addition to a master register file (WRF: Master Register File) storing an original of data and a current register file (CWR: Current Window Register) storing a copy of the current register window pointed by the CWP.

FIG. 3 is a conceptual diagram of a general purpose register including a master register file, a current register and a replace buffer and FIG. 4 is a diagram illustrating a data transfer timing in a case where a SAVE instruction is issued.

As illustrated in FIG. 3, the general purpose register (GPR) 1 includes a master register file (MRF) 2, a replace buffer (CRB) 3 and a current register file (CWR) 4. Between the master register file (MRF) 2 and the replace buffer (CRB) 3, and between the replace register (CRB) 3 and the current register (CWR) 4 are connected by data buses 5, 6 to be transfer paths for data, respectively. The master register file (MRF) 2 is a file to be an original of data. Data of a register window pointed by a current pointer (CWP) 7 is copied in the current register (CWR) 4. Data of the register window is copied in the replace buffer (CRB) 3.

As illustrated in FIG. 4, when the SAVE instruction to increment the current pointer (CWP) is issued, the SAVE instruction is decoded and data stored in the (n+1)th register window which is immediately after the nth register window pointed by the current pointer (CWP) 7 is copied in the replace buffer (CRB) 3. The data copied in the replace buffer (CRB) 3 is transferred, when preceding instructions are all processed, to the current register (CWR) 4.

In a case where, before transferring to the current register (CWR) 4, further consecutively, for example, a SAVE instruction is issued, transferring of data from the master register file (MRF) 2 to the replace buffer (CRB) 3 in the second SAVE instruction is inhibited (stalled) because the replace buffer (CRB) 3 is in use by the first SAVE instruction.

In the instruction processing apparatus, processing in an instruction preceding to the SAVE instruction is executed using data stored in the current register (CWR) 4, the data stored in the replace buffer (CRB) 3 is used to process a consecutive instruction after the SAVE instruction by out-of-order execution. When the processing in the preceding instruction is completed and committed, the current register (CWR) 4 is released, the current pointer (CWP) 7 is increased by one according to the first SAVE instruction, and the data stored in the replace buffer (CRB) 3 is transferred to the current register (CWR) 4 so that data of the (n+1)th register window becomes available for using.

In addition, when transferring of the data from the replace buffer (CRB) 3 to the current register (CWR) 4 is completed, the replace buffer (CRB) 3 is released, the second SAVE instruction is decoded, and data stored in the (n+2)th register window in one next to the (n+1)th register window pointed by the current pointer is copied in the replace buffer (CRB) 3.

As described above, by updating the replace buffer (CRB) 3 when a SAVE instruction or a RESTORE instruction is decoded, and by updating the current register (CWR) 4 when those instructions are committed, data to be used in a consecutive instruction for the SAVE instruction and the like is able to be prepared to execute an out-of-order processing, so that it is possible to speed up processing time.

Conventionally, the multitask has been commonly utilized where CPU resources are allocated a time-sharing manner for each of plural applications and the plural applications are executed in parallel, such as using an application for spreadsheet calculation while using an application for word processing. In addition, in the instruction processing apparatus is provided with plural kinds of computing units, and when an instruction is executed a computing unit according to the contents of the instruction as an object to be executed is used. However, there are a few chances when all kinds of the computing units are simultaneously used, and there may be a computing unit being not in use. Therefore, there is a considerable amount of margin in the operation rate of the calculating units.

Then, as a technique to enhance the operation rate of the calculating units, simultaneously multi threading (SMT: Simultaneously Multi Threading) has been proposed where a calculating unit being not in use for a certain thread is allocated for another thread so that instructions of plural threads are simultaneously processed in parallel.

FIG. 5 is a diagram illustrating conceptually an example of SMT function.

FIG. 5 illustrates how instructions belonging to two kinds of thread of a thread A and a thread B are executed by SMT function. Each of four cells aligned vertically in FIG. 5 represents a calculating unit to perform instruction execution in the instruction processing apparatus. "A" or "B" in each of the cells represents a kind of thread to which an instruction to be executed by a computing unit calculating to the cell belongs.

In addition, a clock cycle in an instruction processing apparatus is illustrated along the horizontal axis. In an example of FIG. 5, in a first cycle (step S511), an instruction of the thread A is executed by two calculating units in the upper two cells, and an instruction of the thread B is executed by two computing units in the lower cells. In a second cycle (step S512), an instruction of the thread A is executed by two calculating units in the uppermost and lowermost cells an instruction of the thread B is executed in two calculating units in the middle cells. In a third cycle (step S513), an instruction of the thread A is executed by three computing units in these upper cells and an instruction of the thread B by the computing unit in the lowest cell.

As described, in the SMT function, it is possible to execute instructions of plural threads in each cycle simultaneously and in parallel, and it is possible to execute an instruction execution in regardless of a program order if a condition to execute the instruction is satisfied (out-of-order).

FIG. 6 is a diagram illustrating a concept of out-of-order execution by a SMT function.

In plural instructions that belongs to a same thread, instruction fetch, instruction decode and commit are required to be executed according to a program order. In contrast, in plural instructions belonging to different threads, in any stage, an instruction in which a condition is satisfied may be executed regardless of an order in which the instruction is issued. In addition, according to SMT function, regarding an instruction belonging to a same thread, there is a case where stall that commit is waited until execution processing of another instruction is completed occurs, however, regarding an instruction belonging to a different thread, it is possible to further reduce the processing time for an application as a whole because it is not required to wait for a commit order and the like.

Patent document 1: Japanese Laid-open Patent Publication No. 2007-87108

Here, in order to achieve out-of-order execution by SMT function as illustrated in FIG. 6, it is conceivable to prepare CPU resources such as a decoder illustrated in FIG. 1, a general purpose register (GPR) 1 and buses 5, 6 illustrated in FIG. 3 for the number of threads. However, there is a problem in which in recent years, the number of threads has been increased and so adding CPU resources introduces size increasing of an instruction processing apparatus and increasing of cost.

In view of the foregoing, it is an object of the present invention to provide an instruction processing apparatus in which size increasing of the apparatus and cost increasing are suppressed and simultaneous multithreading is achieved.

DISCLOSURE OF THE INVENTION

An instruction processing apparatus according to the invention to obtain the object described above, includes:

a thread execution processing section that executes threads each including plural instructions;

a register file that includes a register window including plural registers and is provided individually for the thread;

a current window pointer that is provided individually for the thread and indicates a position of the register where the register window is possible to be inputted and outputted;

a current register that is provided individually for the thread and reads out data held by the register window designated by the current window pointer from the register file to hold the data;

a replacement buffer that is provided individually for the thread and holds data which is transferred from the register file to the current register;

a first transfer path that transfers data in a register file selected from the plurality of register files to one of the plural replacement buffers;

a second data transfer path that transfers data in a replacement buffer selected form the plural replacement buffers to one of the plural current registers;

a calculation section that is provided individually for the thread and executes a switching instruction of the register window; and a control section that controls, if the calculation section executes the switching instruction included in the one of the plural threads, the first data transfer path and the second data transfer path, corresponding to the thread including the switching instruction.

In the instruction processing apparatus according to the invention, the register file, the replace buffer and the current register are prepared for each thread and the first data transfer path to connect the register file and the replace buffer, and the second transfer path to connect the replace buffer and the current register are commonly used in plural threads. In a case where data is transferred according to each of plural switching instructions belonging to threads which are different from each other, it is possible to switch register windows in plural threads without preparing a data path fort each of the plural threads, and it is possible to realize the simultaneous multi-threading function while suppressing size increasing of the apparatus and cost increasing because competing between the first data transfer path and the second data transfer path is mediated.

In addition, of data stored in the register file, data to be used in a subsequent switching instruction is stored in the replace buffer, and when updating the current register, by copying the data stored in the replace buffer, it is possible to save processing time to search target data from the register file in which a lot of data is stored.

In addition, in the instruction processing apparatus, it is preferable that the calculation section obtains information to identify the thread to which the switching instruction belongs from other thread and switches the register window corresponding to the thread identified by the information.

According to the preferable instruction processing apparatus of the invention, it is possible to readily distinguish and perform data transfer between the register file, the replace buffer and the current register.

In addition, in the instruction processing apparatus according to the invention, it is preferable that "the instruction processing apparatus further includes a decode section that decodes the instruction; and an execution section that executes an instruction other than the switching instruction which the calculation section executes, of the instructions decoded in the decode section and is capable of executing plural instructions simultaneously, wherein the calculation section transfers, if the switching instruction is decoded by the decode section, the data to the replacement buffer, and transfers, if all the instructions to be completed before the switching instruction is completed are completed, the data to the current register."

When a switching instruction is decoded, data is transferred, and if all instructions to be completed before the switching instruction are completed, the data is transferred to the current register, so that out-of-order execution is performed and it is possible to reduce processing time.

In addition, in the instruction processing apparatus according to the invention, it is preferable that the decode section decodes the instruction of each of the plural threads at one time with respect to one of the plural threads, and the execution section is capable of executing simultaneously plural instructions included in the threads which are different from each other.

According to the preferable instruction processing apparatus of the invention, while suppressing a circuit size by commonly using a decode section which is in general complicated and large, it is possible to execute simultaneously plural instructions belonging to plural threads.

In addition, in the instruction processing apparatus according to the invention, it is preferable that the calculation section receives the switching instruction which has been decoded by the decode section and transfers the data to the replacement buffer, and the calculation processing apparatus further includes a switching instruction stack that receives, if the switching instruction is decoded by the decode section and there is an instruction which has not been completed and which is to be completed before the switching instruction, the switching instruction before being sent to the calculation section from the decode section to hold the received instruction.

The switching instruction stack is provided, so that it is possible to reliably avoid a failure in which the decode section is occupied by stall.

In addition, in the instruction processing apparatus according to the invention, it is preferable that the switching instruction stack is capable of holding the switching instructions, and the control section controls the first data transfer path and the second data transfer path by sending one by one the switching instructions held by the switching instruction stack to the calculation section.

The switching instructions held in the switching instruction stack are transferred one by one to the calculation means, so that it is possible to readily mediate competing between the first data transfer path and the second data transfer path.

In addition, in the instruction processing apparatus according to the invention, it is preferable that the control section sends to the calculation section first, the switching instruction where all the instructions to be completed before the switching instruction are completed first, of the switching instructions held by the switching instruction stack.

Plural switching instructions are transferred not in an order of being held in the switching instruction stack and switching instruction of the plural switching instructions which is first in a state where the switching instruction is possible to be transferred is first sent to the calculation means, so that it is possible to use effectively the first data transfer path and the second data transfer path, and to reduce processing time.

In addition, in the instruction processing apparatus according to the invention, it is preferable that the control section sends first, if all the instructions to be completed before the switching instructions are completed simultaneously with respect to the plural switching instructions held by the switching instruction stack, the switching instruction which is held first by the switching instruction stack of the plural switching instructions.

According to the preferred instruction processing apparatus, it is possible to readily mediate competing between the first data transfer path and the second data transfer path.

In addition, in the instruction processing apparatus according to the invention, it is preferable that the switching instruction stack also holds, associating with the switching instruction, a thread identifier to identify the thread to which the switching instruction belongs from the other thread and an instruction identifier to identify the switching instruction from the other instruction being in execution in the instruction processing apparatus.

The thread identifier and the instruction identifier are held with being associated with a switching instruction, so that it is possible to readily identify what thread the switching instruction belongs to and which switching instruction in the thread is the switching instruction.

In addition, in the instruction processing apparatus according to the invention, it is preferable that the instruction processing apparatus further includes an instruction input section that obtains the instruction from each of the plural threads to input the inputted instruction to the decode section, and stops, if the switching instruction is held in the switching instruction stack, inputting the instruction with respect to the thread to which the switching instruction belongs, and inputs the instruction belonging to the other thread.

Commonly, in plural instructions belonging to a same thread, those instructions need to be executed according to a program order and in plural instructions each belonging to threads which are different from each other, those instructions may be executed in any order. When a switching instruction is held in the switching instruction stack, inputting an instruction is interrupted for a same thread as that the switching instruction belongs to and an instruction belonging to another thread is inputted, so that data of an instruction which may be executed first may be transferred first, and it is possible to reduce processing time.

In addition, in the instruction processing apparatus according to the invention, it is preferable that the decode section simultaneously holds the instructions and decodes the instructions which the decode section holds, and the instruction processing apparatus further includes a pre-decode section that confirms, before the decode section, whether or not the instruction is the switching instruction by decoding which is simpler than decoding of the instruction by the decode section and an instruction input section that obtains the instruction from each of the plural threads and inputs the obtained instruction to the decode section, and adjusts an input timing such that at most one instruction which is confirmed to be the switching instruction by the pre-decode section is held at one time by the decode section.

For an instruction confirmed to be a switching instruction, input timing is adjusted such that at most one instruction confirmed to be the switching instruction is held in the decode section at one time, so that it is possible to securely avoid stall in the decode section.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 18 is a diagram illustrating a flow of MOVE_ALL processing.

FIG. 19 is a diagram illustrating a data transfer timing in switch processing.

BEST MODE FOR CARRYING OUT THE INVENTION

In the following, an embodiment will be explained with reference to the drawings.

Figure 7:
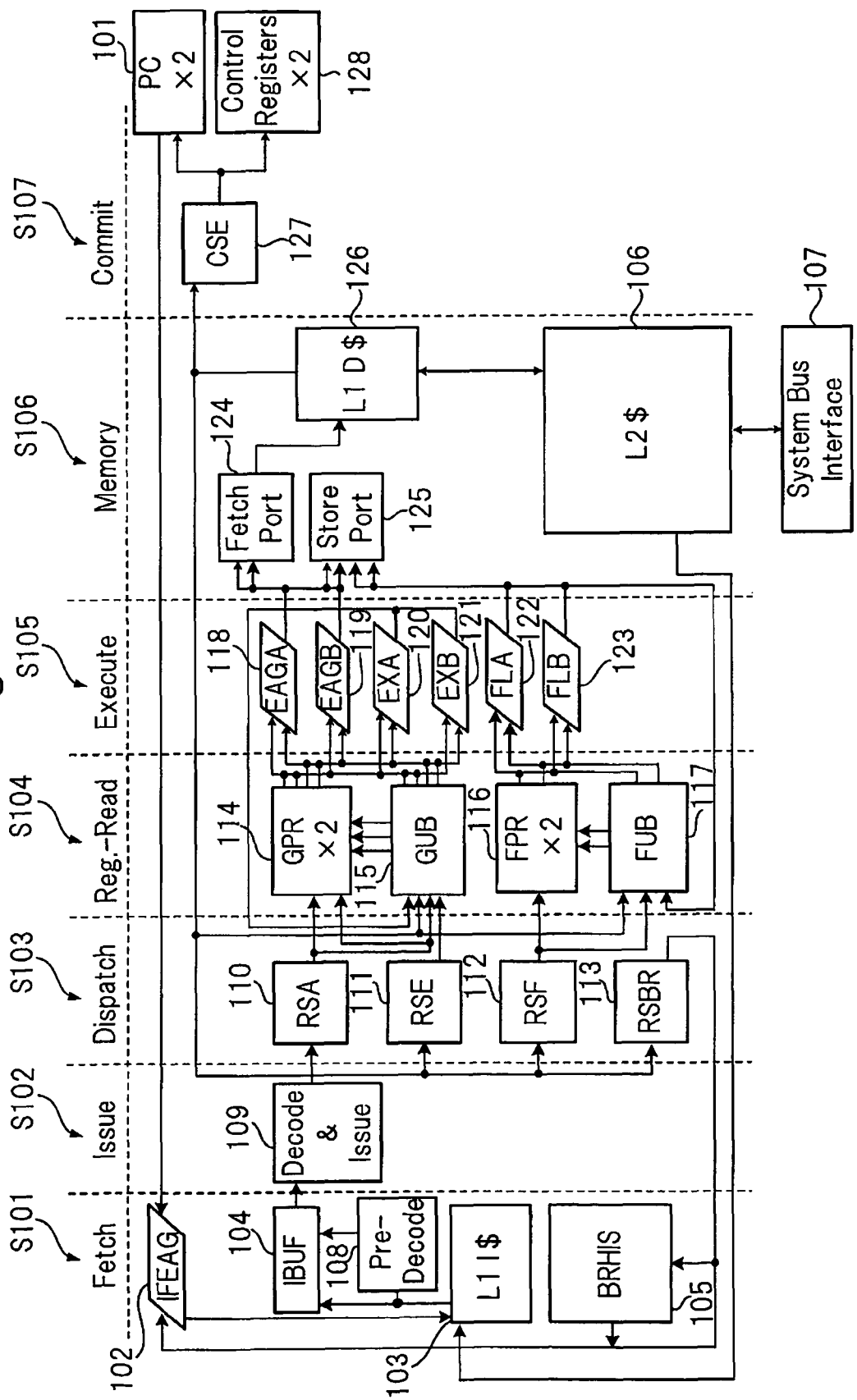
FIG. 7 is a hardware block diagram of a CPU 10 that is one embodiment of the instruction processing apparatus.

FIG. 7 is a hardware block diagram of a CPU 10 that is one embodiment of the instruction processing apparatus.

The CPU 10 is mounted in a personal computer and the like to execute various processing. Simultaneous multi threading (SMT: Simultaneous Multi Threading) in which plural threads each including a series of plural instructions are simultaneously executed is employed in the CPU 10. In addition, an out-of-order mechanism where an instruction first meets a condition where the instruction is to be executed may be executed first regardless of an issuing order of the instruction is employed among the plural threads.

The CPU 10 illustrated in FIG. 7 is for simultaneously processing instructions in two kinds of threads, processes of seven stages illustrated in the following are sequentially performed. That is, the processes of the seven stages: a fetch stage (step S101) to alternately fetch instructions of the two kinds of threads by in-order execution; a decode stage (step S102) to decode a process represented by a fetched instruction by in-order execution; a dispatch stage (step S103) to store by in-order execution a decoded instruction in a reservation station, which will be described later, connected to a computing unit required to execute a process of the instruction and to deliver the stored instruction to the computing unit by out-of-order execution; a read out stage (step S104) to read out from a register an operand required to execute the instruction stored in the reservation station by out-of-order execution; an execution stage (step S105) to execute an instruction stored in the reservation station using an operand read out from the register by out-of-order execution; a memory stage (step S106) to perform recording an execution result in a memory outside the CPU 10 and the like by out-of-order execution; and a commit stage (step S107) to perform commit to update a register for storing the operand and the like according to an execution result to commit the execution result by in-order execution, are sequentially performed.

In the following, each of the stages will be explained in detail.

In the fetch stage (step S101), instruction fetch (fetch) is designated by two program counters 101 prepared for the respective two kinds of threads (thread 0 and thread 1) respectively, an instruction fetch section 102 fetches an instruction from an input side primary cache 103 of to an instruction buffer 104. The two program counters 101 alternately operate, in fetch in one time, either one of the two program counters 101 instructs to fetch an instruction of a corresponding thread. Further, in this embodiment, in fetch in one time, fetch of eight instructions is performed in a process order in the thread by in-order execution.

The CPU 10 includes a branch prediction section 105. The branch prediction section 105 predicts whether or not there is an instruction to be fetched in an order different from a written order, and a position where the instruction is written in a thread, before executing a preceding instruction. Then, the instruction fetch section 102 executes fetch, referring to a predicted result of the branch prediction section 105.

Here, a program to be executed by the CPU 10 according to this embodiment is stored in an external memory, which is not illustrated. The CPU 10 is connected to the external memory and the like via a system bus interface 107 connected to a secondary cache 106 included in the CPU 10. When the program counters 101 instruct to fetch an instruction, the instruction fetch section 102 refers to the prediction result of the branch prediction section 105 to request the input side primary cache 103 eight instructions. Then, the requested eight instructions are inputted from the external memory via the system bus interface 107 and the secondary cache 105 to the input side primary cache 103, and the input side primary cache 103 delivers those instructions to the instruction buffer 104. At this time, in this embodiment, on delivering, a pre-decode section 108 applies a simple decode (pre-decode) to each instruction. Then, the pre-decode section 108 adds a flag representing a result by the pre-decode described later to each instruction to be delivered to the instruction buffer 104.

In the decode stage (step S102), the instruction buffer 104 inputs four instructions of the eight instructions taken in and held by a decode section 109 by in-order execution. The decode section 109 decodes each of the inputted four instructions by in-order execution. In addition, for each instruction, a number from "0" to "63" as an instruction identification (IID: Instruction IDentification) is allocated in a decode order for each instruction with respect to each thread. Here, in this embodiment, when an instruction of the thread 0 is decoded, IIDs from "0" to "31" are allocated, and when an instruction of the thread 1 is decode, IIDs from "32" to "63" are allocated. At this time, the decode section 109 sets the IID allocated for the instruction to be decoded in a vacant entry in a group of entries to which an instruction as an object to be decoded belongs of a commit stack entry (CSE) 127 (described later) which has 64 entries in total of 32 entries for the thread 0 and 32 entries for the thread 1.

The decode section 109 determines, for each of the decoded four instructions to which IID is allocated respectively, a computing unit required to execute processing of each instruction. Then, the decode section 109 stores each decoded instruction in a reservation station connected to the computing unit required to execute processing of each instruction by in-order execution.

The reservation station holds plural of the decoded instructions. The reservation station in the dispatch stage (step S103), delivers each instruction to the computing unit by out-of-order execution. In other words, the reservation station delivers first an instruction in which an operand required to execute processing and the computing unit are confirmed, regardless of an process order in the thread. At this time, if there are plural instructions which may be delivered, the reservation station delivers first an instruction which is decoded first of those plural instructions. The CPU 10 of the present embodiment includes following four kinds of reservation stations. That is, the four kinds of reservation stations: a reservation station for address creation (RSA: Reservation Station for Address Creation) 110; a reservation station for integer calculation (RSA: Reservation Station for Execution) 111; a reservation station for floating point calculation (RSL: Reservation Station for Floating Point) 112; and a reservation station for branch (RSBR: Reservation Station for BRanch) 113 are included in the CPU 10. Here, RSA 110, RSE 111 and RSF 112 are connected to corresponding computing units via registers for storing operand, respectively. In contrast, RSBR 113 is connected to the above-described branch prediction section 105, and plays roles such as waiting for confirmation of a prediction result in the branch prediction section 105 and re-fetch of an instruction in a case of a prediction failure.

In the register readout stage (step S104), an operand in a register is read out by out-of-order execution. In other words, regardless of a processing order in a thread, an operand in a register connected to the reservation station which has delivered the instruction to the computing unit is read out, and is delivered to a corresponding computing unit. The CPU 10 includes two kinds of registers: an integer register (GPR: General Purpose Register) 114; and a floating point register (FPR: Floating Point Register) 116. Here, GPR 114 and FPR 116 are both visible to a program and are provided in each of the thread and the thread 1. In addition, a buffer to hold an execution result of an instruction until each register is updated is connected to each of the GPR 114 and the FPR 116. An integer register update buffer (GUB: GPR Update Buffer) 115 is connected to the GPR 114. A floating point register update buffer (FPR Update Buffer) 116 is connected to the FPR 116.

Because address creation and integer calculation are executed using an integer operand, the GPR 114 is connected to the RSA 110 and RSE 111 described above. In addition, because integer calculation using an operand held in the GUB 115 in a stage before the GPR 114 is updated is permitted, the GUB 115 is connected to the RSA 110 and the RSE 111. Further, because floating point calculation is executed using an operand in a floating point form, the FPR 116 is connected to the above-described RSF 112. In addition, in the present embodiment, because floating point calculation using an operand held in the FUB 117 is permitted, the FUB 117 also is connected to the RSF 112.

In addition, two of address creation computing units (EAGA and EAGB: Effective Address Creation units A and B) 118, 119, two of integer computing units (EXA and EXB) 120, 121 and two of floating point computing units (FLA and FLB) 122, 123 are included in the CPU 110 of the present embodiment. The GPR 114 and GUB 115 are connected to the EAGA 118, EAGA 119, EXA 120 and EXB 121 which use an integer operand. The FPR 116 and FUB 117 are connected to the FLA 122 and FLB 123 which use a floating point operand.

In the execution stage (step S105), execution of an instruction is performed by out-of-order execution by a computing unit. In other words, regardless of a processing order in a thread, a computing unit to which an instruction is delivered from a reservation station and to which an operand required for calculation is delivered from a register, of the above-describe plural kinds of computing units, executes processing of the delivered instruction using the delivered operand. In addition, in the execution stage (step S105), when the instruction and the operand are delivered to another computing unit while a certain computing unit is executing, those computing units execute processing simultaneously and in parallel.

In this execution stage (step S105), when an instruction of address creation is delivered to the EAGA 118 from the RSA 110 and an integer operand is delivered to the EAGS 118 from the GPR 114, the EAGA 118 executes address creation processing using the integer operand. In addition, when an instruction of integer calculation processing is delivered to the EXA 120 from the RSE 111 and an integer operand is delivered to the EXA 120 from the GPR 114, the EXA 120 executes integer calculation processing using the integer operand. When an instruction of floating point processing is delivered to the FLA 122 from the RSF 112 and a floating point operand is delivered to the FLA 122 from the FPR 116, the FLA 122 executes floating point calculation processing using the floating point operand.

Because execution results of the EAGA 118 and the EAGB 118 are used for an access to the external memory via a cache section or the system bus interface 107, these computing units are connected to a fetch port 124 which is a readout port of data from a memory and a store port 125 which is a write port. The execution results of the EXA 120 and the EXA 121 are connected to GUB 115, an intermediate buffer for updating the GPR 114 and further to the store port 125 which play a role of an intermediate buffer for updating a memory. In addition, execution results of the FLA 122 and FLB 123 are connected to FUB 117, an intermediate buffer for updating the FPR 116, and further to the above-described store port 125 for updating a memory. In addition, the EXA 120, EXB 121, FLA 122 and FLB 123 are connected to a CSE 127 by a connecting line, whose illustration is omitted for avoiding complication of the figure. In a case where processing executed in each computing unit is processing that is completed by completion of processing in each computing unit without requiring an access to an external memory, an execution completion notification is sent from each computing unit to the CSE 127 at the time of completion of execution.

In the memory stage (step S106), an access to the external memory such as storing an execution result to the external memory is performed by out-of-order execution. In other words, in a case where there are plural instructions requiring such an access, the access is performed in an order in which the execution results are obtained regardless of an order of processing in a thread. In this memory stage (step S106), accessing is performed by the fetch port 124 or the store port 125 via a memory cache 126, the secondary cache 106 and the system bus interface 107. In addition, when accessing the external memory is completed, an execution completion notification is sent from the fetch port 124 or the store port 125 to the CSE 127 via a connecting line not illustrated.

In the commit stage (step S107), the CSE 127 updates by in-order execution a control register 128 that holds an operand used for processing other than the above-described processing in the GPR 114, FPR 116, program counters 101 and the CPU 10 as follows. In the execution completion notification sent to the CSE 127 from the above-described computing units and the like, there are described an IID of an instruction corresponding to the execution completion notification and information (commit information) required for commit (commit) of a execution result such as a register of target to be updated after completion of the instruction. When the execution completion notification is sent to the CSE 127, the CSE 127 stores the commit information described in the execution completion notification in an entry for which an IID same as the IID described in the execution completion notification is set, of the 64 entries included in the CSE 127. Then, the CSE 127 executes by in-order execution updating of a register according to each instruction already stored, according to an order of processing in the thread.

The CPU 10 is configured in such manner in general, and operates along the above-described seven stages.

Figure 1:
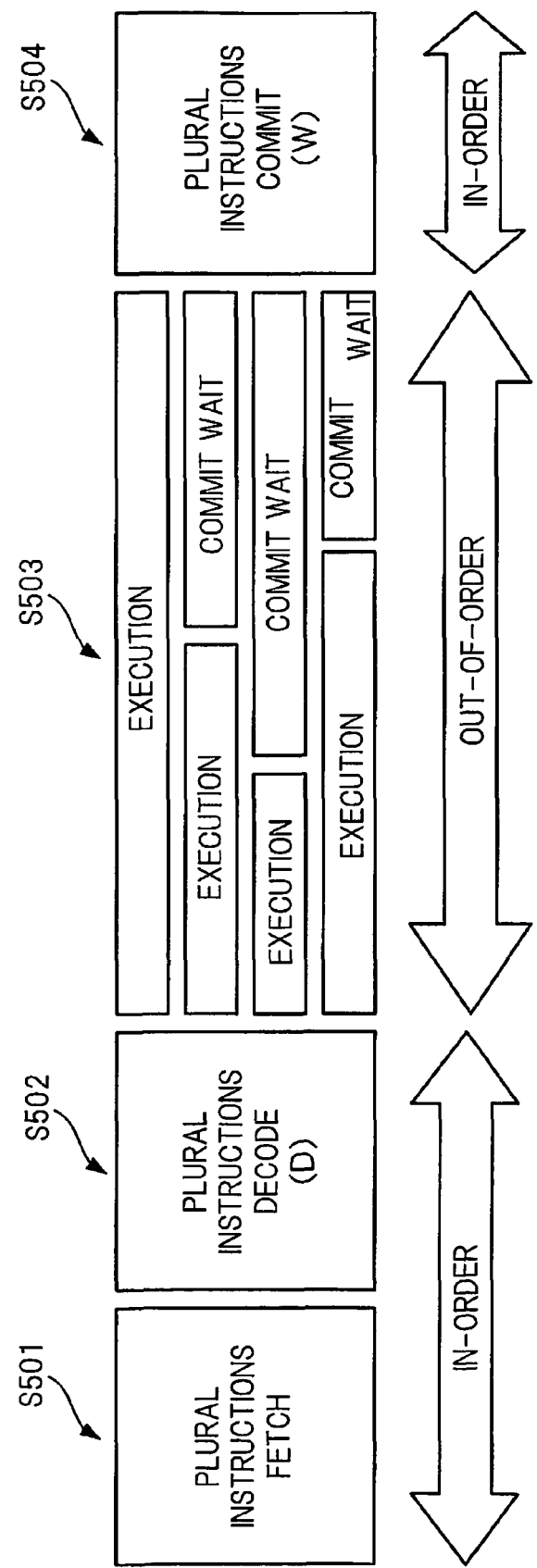
FIG. 1 is diagram illustrating an example in which four instructions included in a program are processed by out-of-order execution.

In the following, transfer control of data in the GPR 114 illustrated in FIG. 1 and detail configurations of elements relating to the transfer control of data will be explained. Incidentally, in order to simplify the explanation, an example in which the two threads are executed simultaneously will be explained, those two threads are distinguished by alphabets "A" and "B" affixed to ends of the references.

Figure 8:
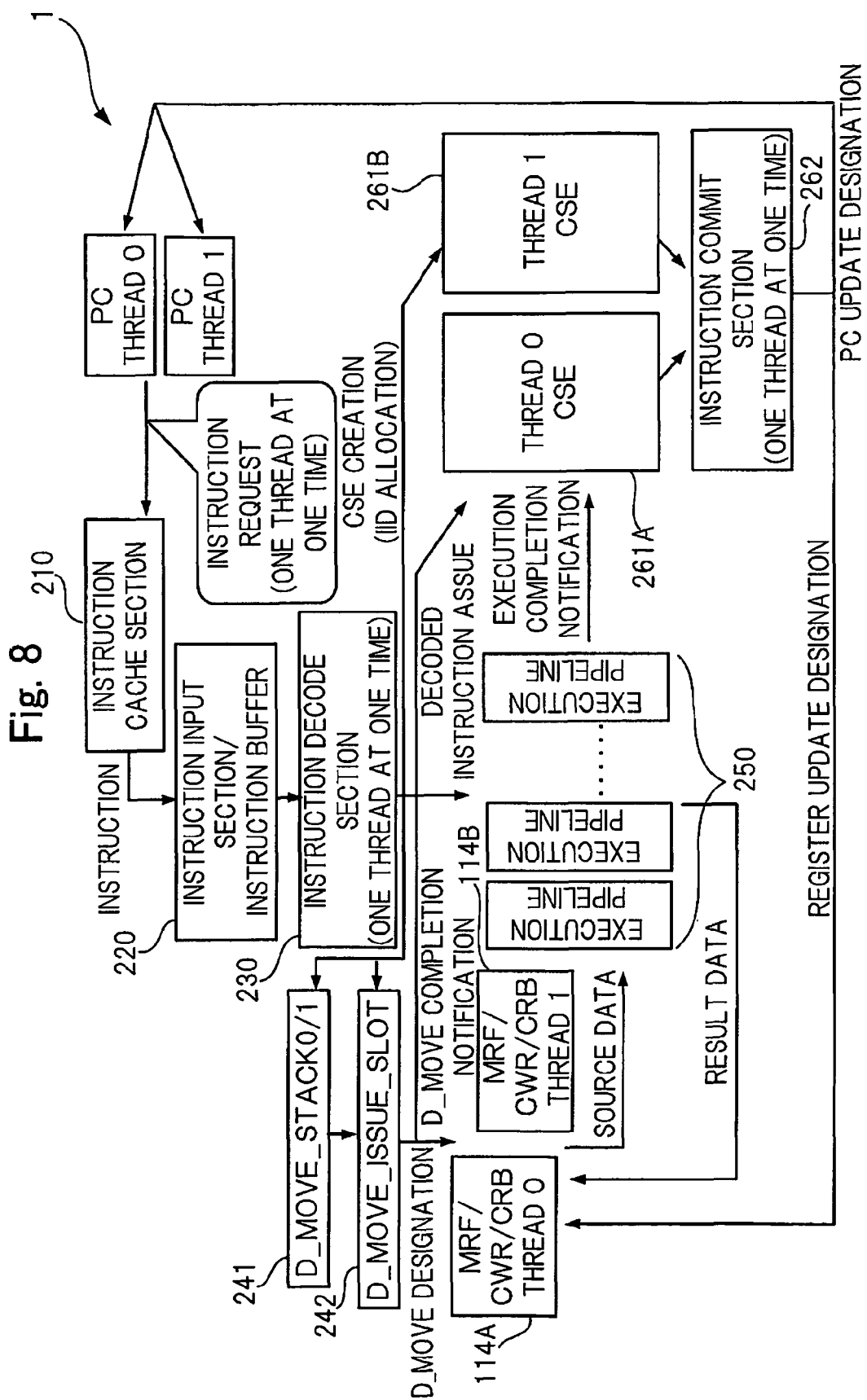
FIG. 8 is a functional block diagram of the CPU.

FIG. 8 is a functional block diagram of the CPU 10.

In the present embodiment, GPR 114A, 114B corresponding to the respective two threads are prepared in the CPU 10. As explained in FIG. 2, the GPR 114A, 114B are divided into plural register windows, and data of a register window pointed by the CWP is used in the calculation stage (step S105) in FIG. 7. In the following, an instruction to switch a register window used in the step S105 by moving the CWP one by one is referred to a switching instruction.

The CPU 10 includes an instruction cache section 210, an instruction input section 220, an instruction decode section 230, a D_MOVE_STACK 241, a D_MOVE_SLOT 242, GPR 114A, 114B, a computing units 250, CSE 261A, 261B and an instruction commit section 262. The instruction cache section 210 caches plural instructions included in each of the two threads. The instruction input section 220 inputs the instructions cached in the instruction cache section 210 to the instruction decode section 230. The instruction decode section 230 decodes the inputted instructions. If an instruction decoded in the decode section 230 is a switching instruction, the switching instruction is stored in the D_MOVE_STACK 241. An instruction for executing the switching instruction is inputted to the D_MOVE_ISSUE_SLOT 242. The GPR 114A, 114B are also illustrated in FIG. 7. The computing unit 250 executes in parallel the decoded plural instructions. The CSE 261A, 261B are tables to manage in instruction execution state for each thread. The commit section 262 commits completion of a thread at a stage in which a series of instructions included in each thread are completed. For plural instructions belonging to a same thread, the instructions are decoded in a predetermined order in the instruction decode section 230 (in-order), processing is executed in parallel beyond the order in the computing unit 250 (out-of-order), commit is performed in a determined order after waiting completion of a preceding instruction belonging to the same thread in the instruction commit section 262 (in-order). In addition, for plural instructions belonging to different threads, the instructions are decoded for each thread one by one in the instruction decode section 230, processing is simultaneously carried out for both in the computing unit 250, the instructions are committed for each thread one by one in the instruction commit section 262, and it is possible to execute the plural instructions by out-of-order execution.

Figure 9:
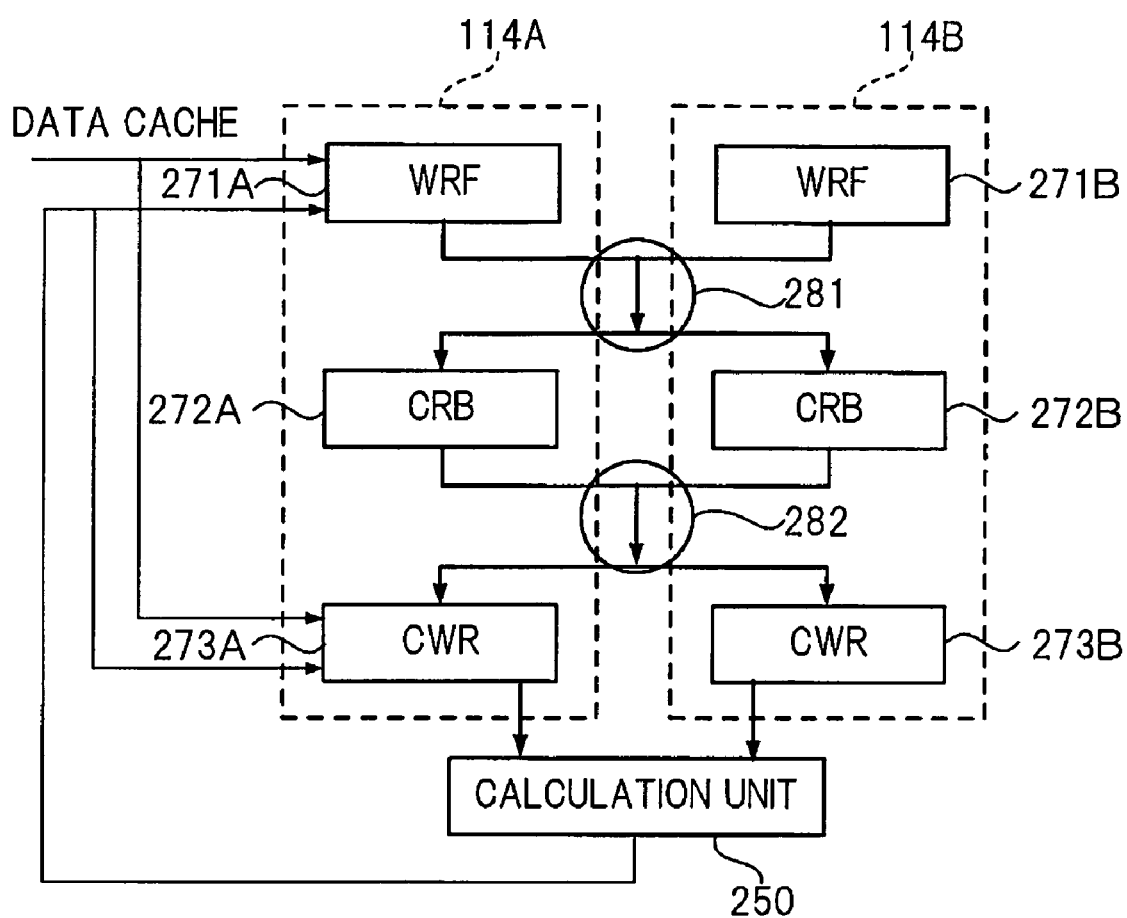
FIG. 9 is a block diagram illustrating a configuration of a GPR illustrated in FIG. 8.

FIG. 9 is a block diagram illustrating a configuration of the GPR 114A, 114B illustrated in FIG. 8.

Figure 2:
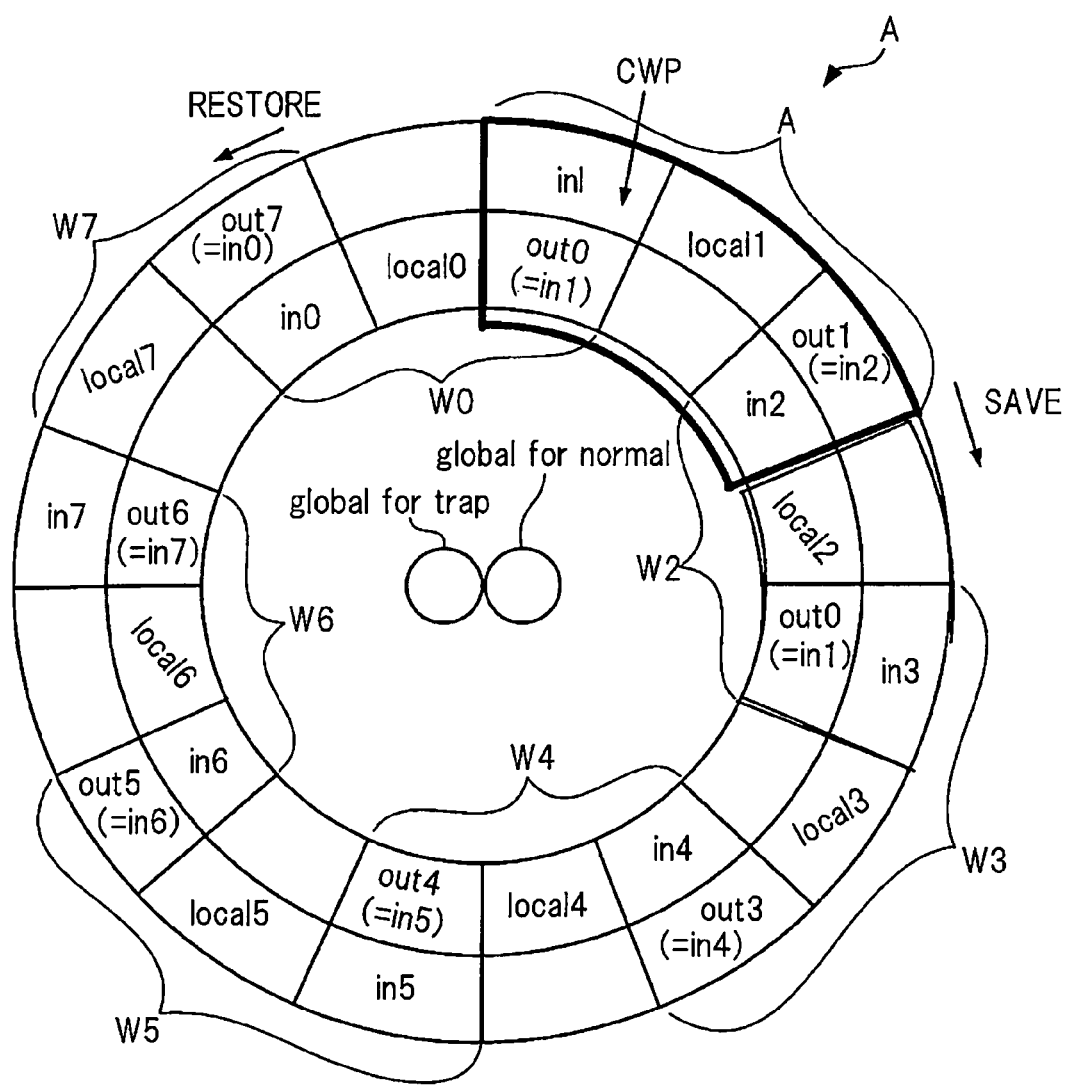
FIG. 2 is a schematic diagram of a register file including plural register windows.
Figure 3:
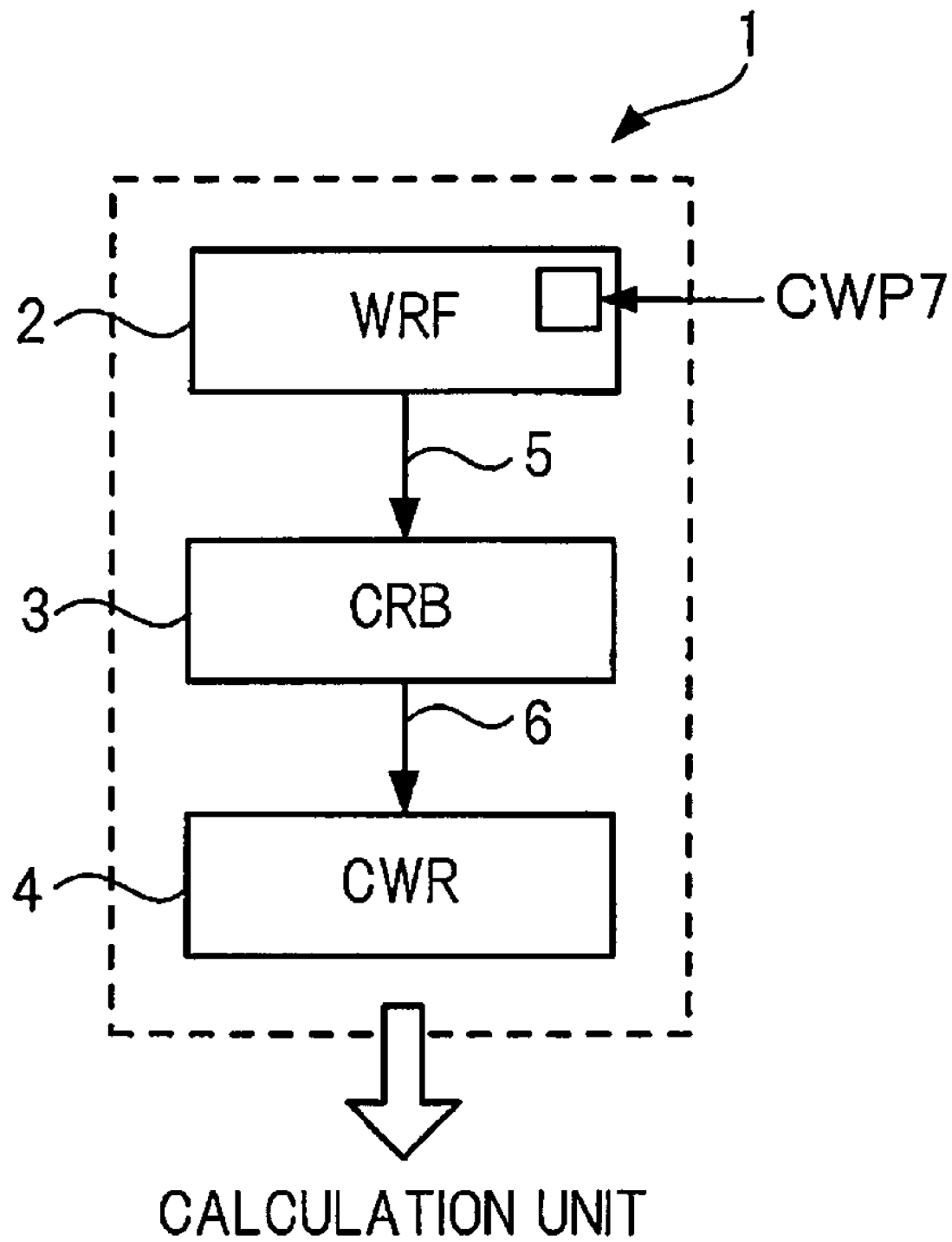
FIG. 3 is a conceptual diagram of a general purpose register provided with a master register file, a current register and a replace buffer.
Figure 4:
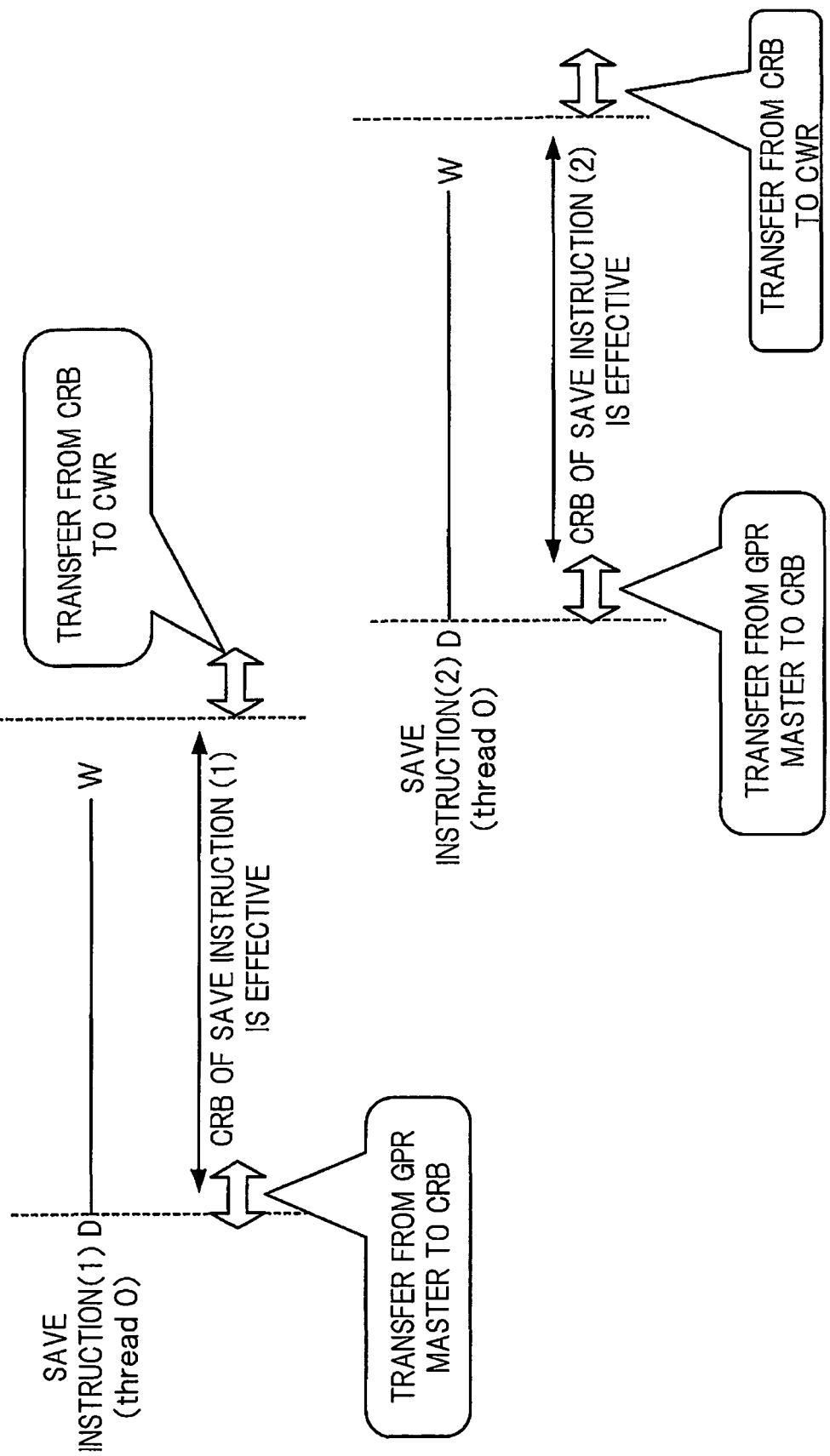
FIG. 4 is a diagram illustrating data transfer timing in a case where a SAVE instruction is issued.
Figure 5:
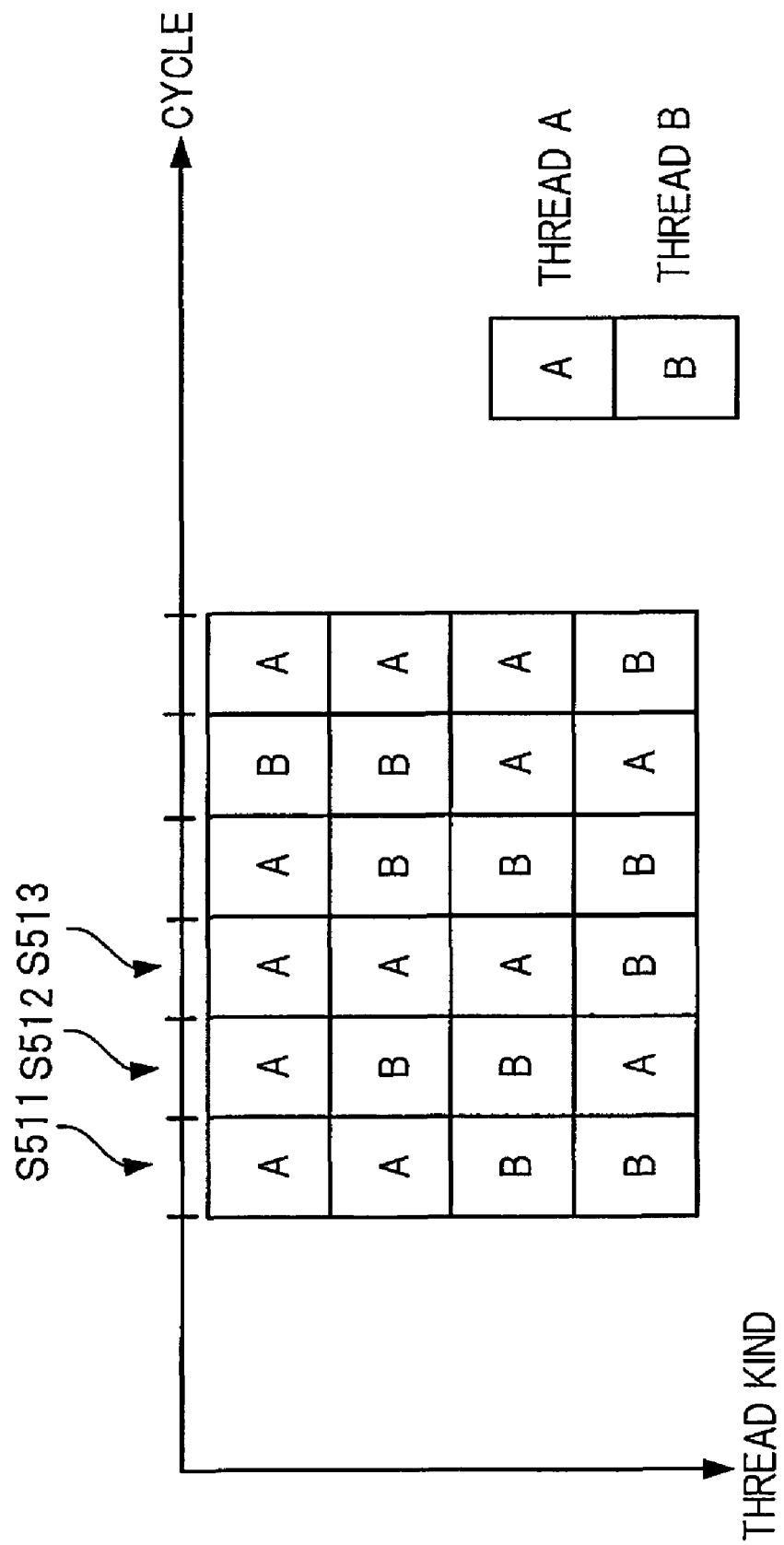
FIG. 5 is a diagram illustrating conceptually an example of SMT function.
Figure 6:
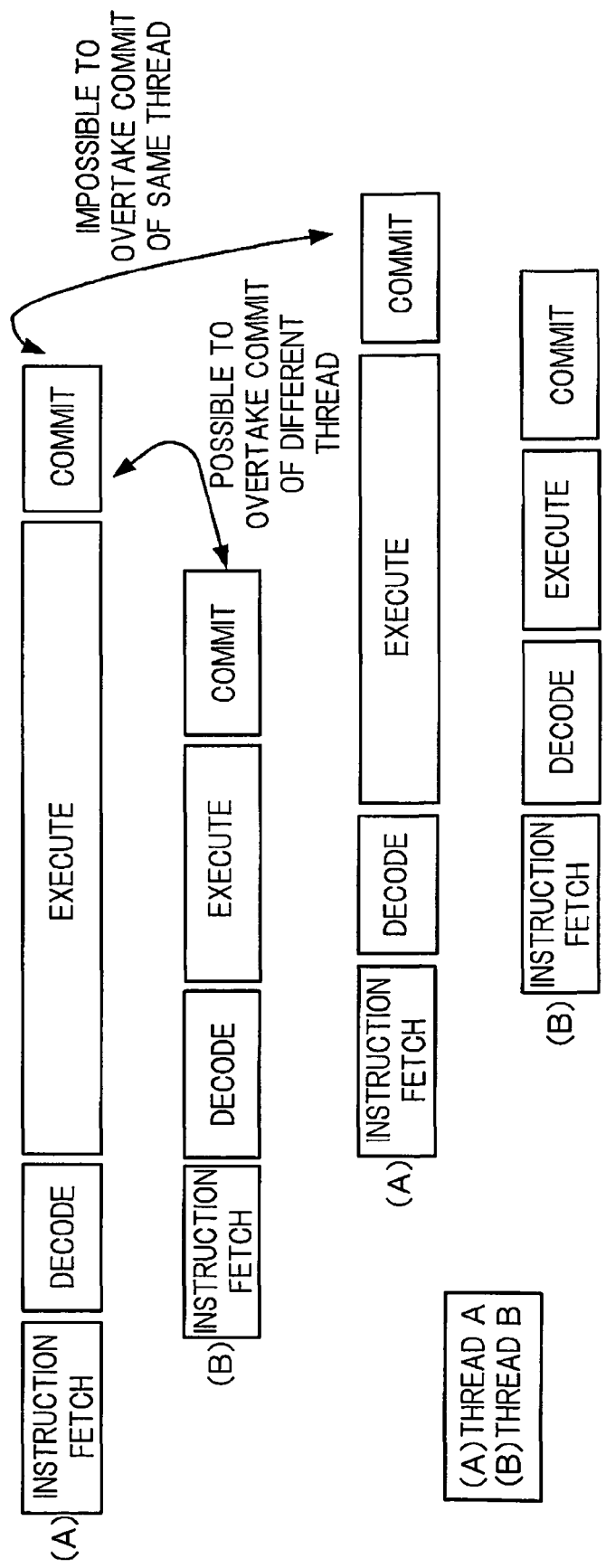
FIG. 6 is a diagram illustrating a concept of out-of-order execution by SMT function.

As explained with reference to FIGS. 2 and 3, MRF 271A, 271B are divided into plural register windows. Data of a register window that the CWP is currently pointing is stored in CWR 273A, 273B. The CRB 272A, 272B are provided between the MRF 271A, 271B and CWR 273A, 273B. Data to be used in a subsequent instruction for a switching instruction is stored in the CRB 272A, 272B.

As a switching instruction to switch a register window used in the computing unit 250 to an adjacent register window, there exist a SAVE instruction to increment the CWP and to advance a register window to be referred to a register window immediately forward and a STORE instruction to decrement the CWP and to return a register window to be referred to a register window immediately backward. As an instruction to change the register window other than the switching instruction, there is a CWP update instruction, trap and the like. The CWP update instruction directly designates a register window pointed by the CWP and switches a register window to be referred to an arbitrary register window. When a switching instruction is decoded, data of a register window according to the switching instruction is transferred from the MRF 271A, MRF 271B corresponding to a thread to which the switching instruction belongs to the CRB 272A, 272B. When processing of a preceding instruction belonging to the same thread to which a switching instruction belongs is completed in the computing unit 250, the CWR 273A, 273B corresponding to the thread are released and data is transferred to the CWR 130A, 130B released from the CRB 272A, 272B. In the following, transferring of data from the MRF 271A, 271B to the CRB 272A, 272B by the SAVE instruction and the RESTORE instruction is referred to D_MOVE, and transferring of data from the CRB 272A, 272B to the CWR 273A, 273B by the SAVE instruction and the RESTORE instruction is referred to W_MOVE.

Transferring of data by a CWP update instruction or a trap is referred to MOVE_ALL. In MOVE_ALL, when the CWP update instruction is committed and when trap processing is determined to be executed, data pointed by the CWP is all transferred from the MRF 271A, 271B via the CRB 272A, 272B to the CWR 273A, 273B. At this moment, the CRB 272A, 272B become relaying buffers.

The MRF 271A, 271B and the CRB 272A, 272B are connected through a D_MOVE bus 281 that is a data transfer path. The CRB 272A, 272B and the CWR 2723A, 273B are connected through a W_MOVE bus 282 that is a data transfer path. In the present embodiment, the D_MOVE bus 282 and the W_MOVE bus 282 are shared by the two threads. By this manner, increasing of entire size of the CPU 10 and cost increasing are suppressed.

In the present embodiment, the GPR 114A, 114B to store data, the CSE 261A, 261B that are tables for commit processing, and the like are prepared for the number of threads. The computing unit 250 is capable of executing in parallel plural instructions belonging to each of plural threads. The instruction decode section 230, the instruction commit section 262, the D_MOVE bus 281, the W_MOVE bus 282 and the like are shared by plural threads. Therefore, an execution order of each kind of processing needs to be controlled such that competing between common elements is not caused by plural instructions belonging to each of threads. Particularly, in the switching instruction, in addition to mediating competing between the D_MOVE bus and the W_MOVE bus in plural instructions of different threads, in order to avoid overwriting of data used in processing in execution, an execution order of the plural instructions belonging to the same thread needs to be controlled.

Figure 10:
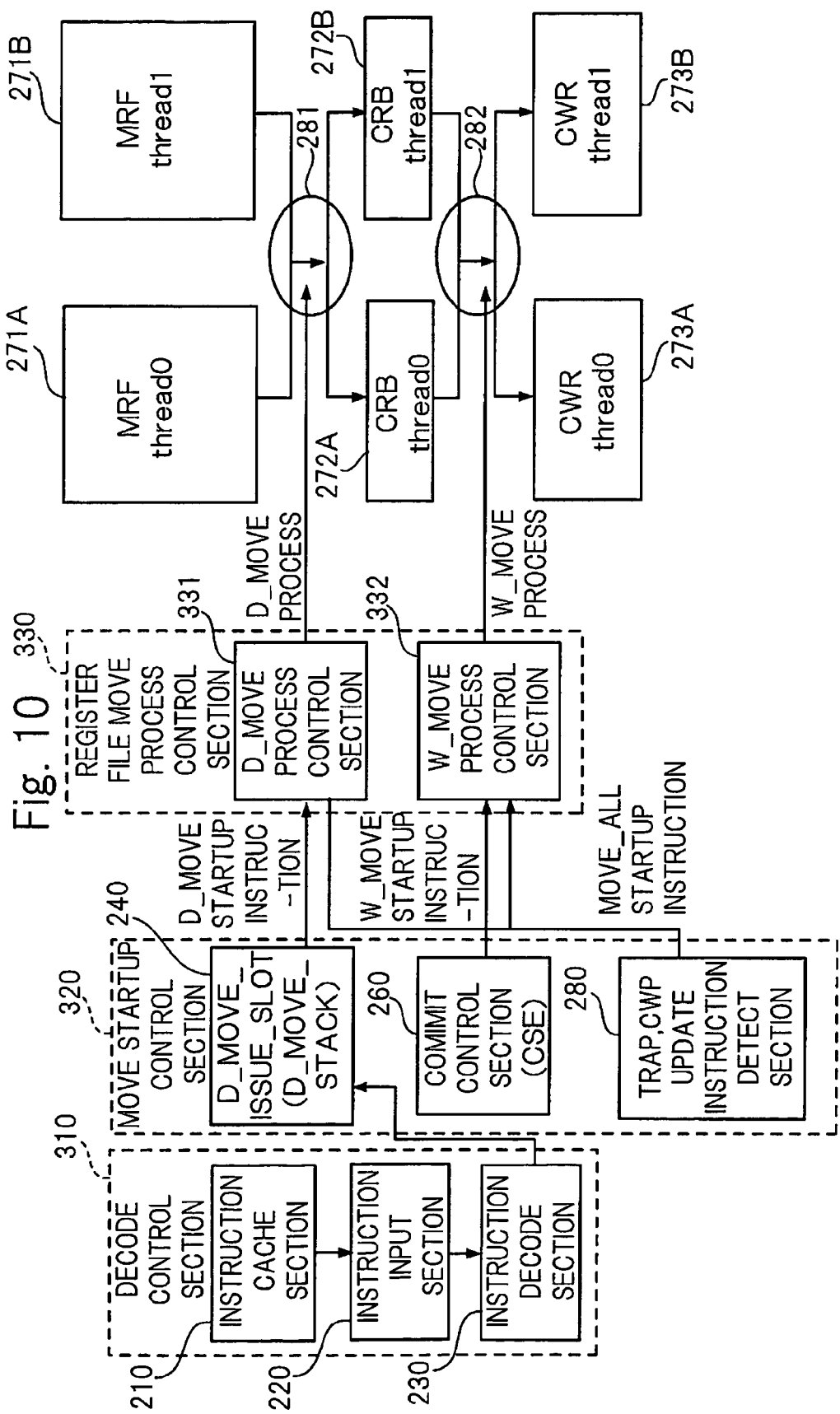
FIG. 10 is a functional block diagram of an element to control an execution timing of a switching instruction.

FIG. 10 is a functional block diagram of an element to control execution timing of a switching instruction.

In FIG. 10, a decode control section 310, a MOVE startup control section 320, a register file MOVE processing control section 330 and the GPR 114A, 114B are illustrated. The decode control section 310 controls timing of decode of an instruction. The MOVE startup control section 320 controls timing of data transfer processing according to a switching instruction. The register file MOVE processing control section 330 receives an instruction of data transfer processing from the MOVE startup control section 320 to execute the D_MOVE, the W_MOVE or the MOVE_ALL.

Firstly, information that is used in controlling execution timing in each of elements illustrated in FIG. 10 will be explained.

Figure 11:
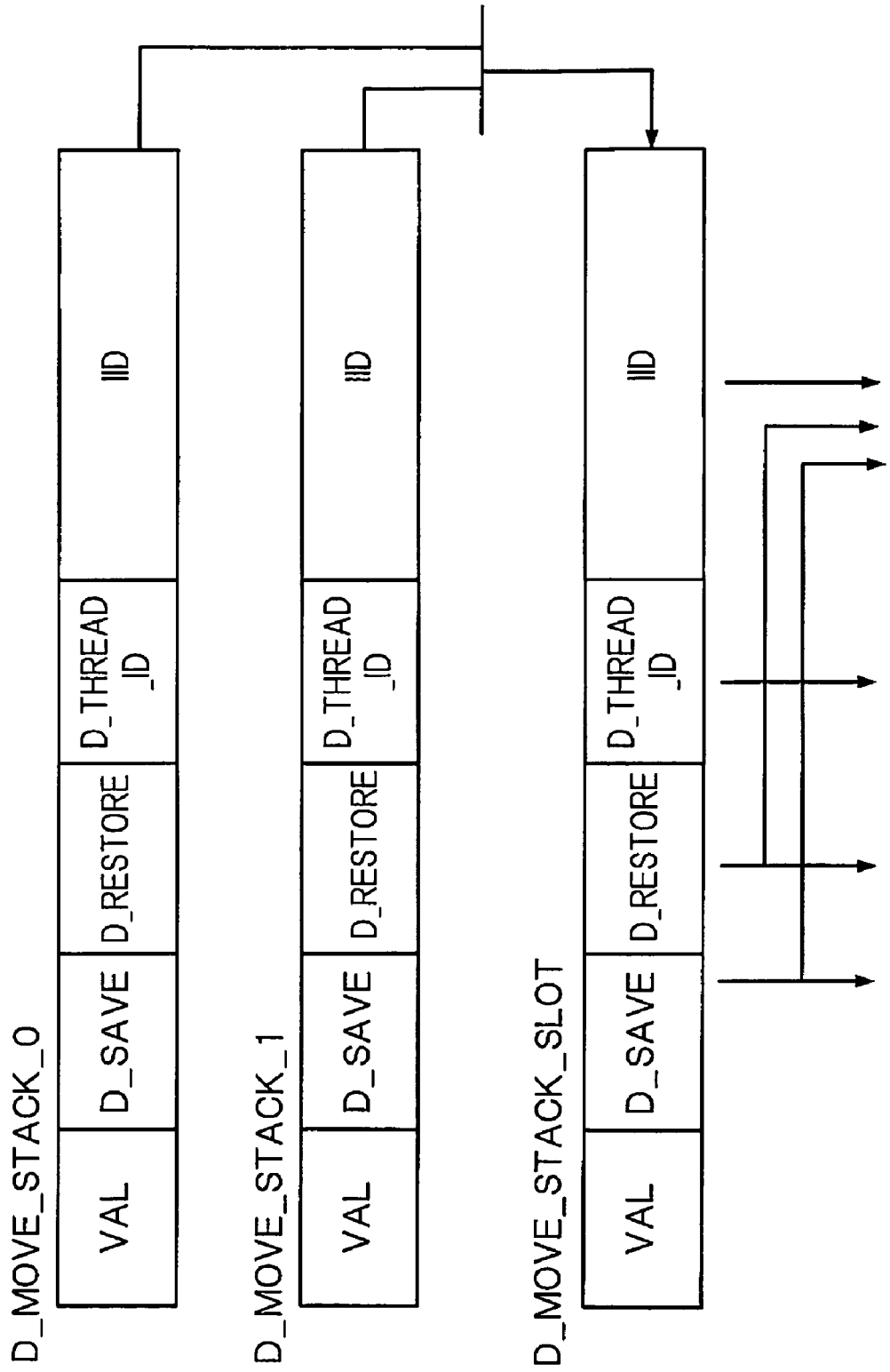
FIG. 11 is a diagram illustrating information that is registered in a D_MOVE_STACK and a D_MOVE_ISSUE_SLOT.
Figure 12:
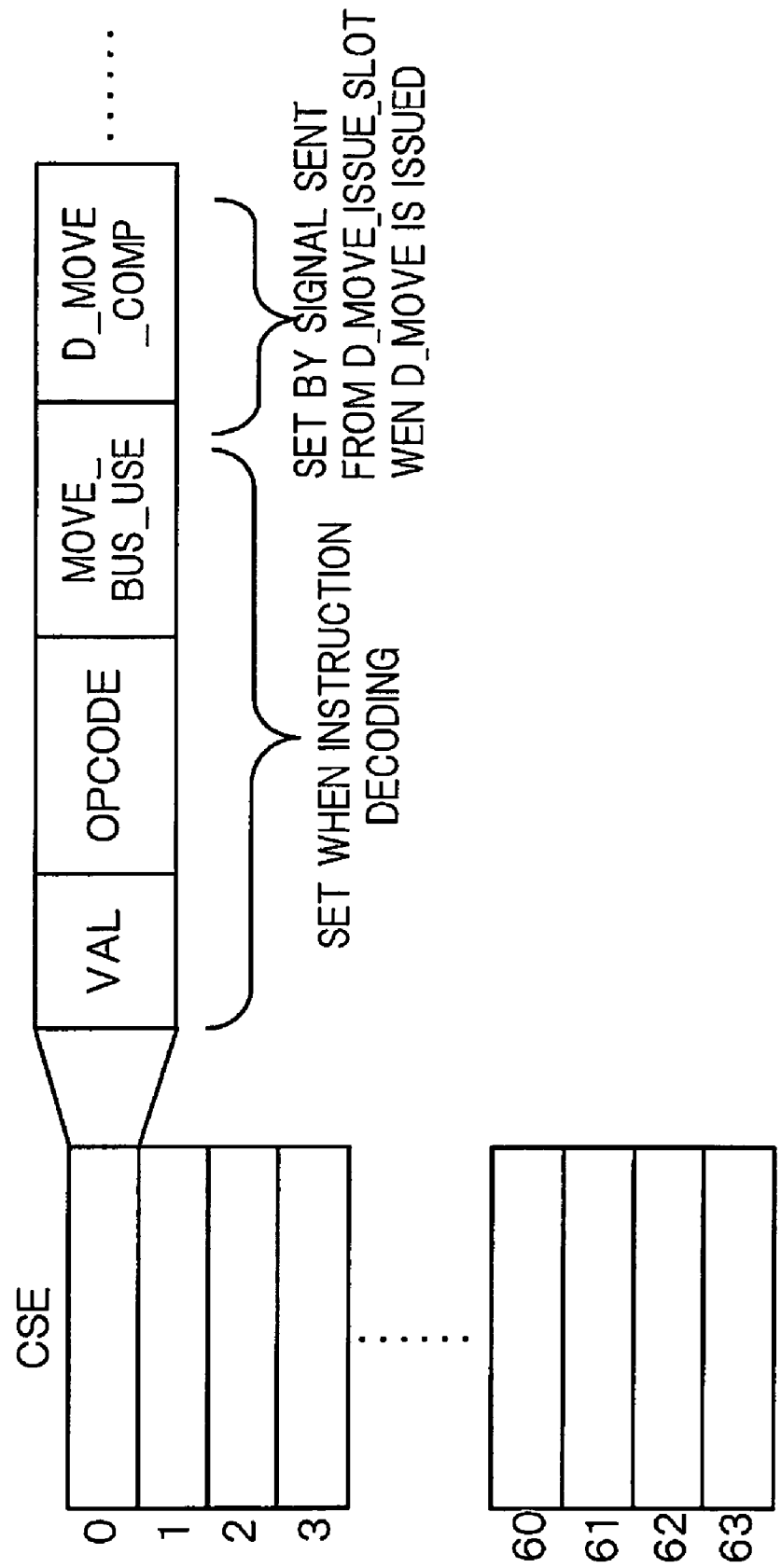
FIG. 12 is a diagram illustrating information that is registered in a CSE.

FIG. 11 is a diagram illustrating information registered in the D_MOVE_STACK 241 and the D_MOVE_ISSUE_SLOT 242. FIG. 12 is a diagram illustrating information registered in the CSE 261A, 261B.

The D_MOVE_STACK 241 is a stack in which a switching instruction in wait is stored in a case where the D_MOVE processing may not be started. The D_MOVE_STACK 241 is prepared one for each of the two threads. The D_MOVE_ISSUE_SLOT 242 is connected to a D_MOVE processing control section 331 and is a buffer to relay for only one cycle when starting D_MOVE processing. A SAVE instruction and a RESTORE instruction which are decoded in the decode section 230 are registered in the D_MOVE_STACK 241 and the D_MOVE_ISSUE_SLOT 242. The SAVE instruction and the RESTORE instruction include instruction contents (VAL), a SAVE flag (D_MOVE), a RESTORE flag (D_RESTORE), a thread identification (D_THREAD_ID) and an instruction identification (IID). When an instruction is a SAVE instruction, "1" is set in the SAVE flag (D_SAVE). When an instruction is a RESTORE instruction, "1" is set in the RESTORE flag (D_RESTORE). The thread identification (D_THREAD_ID) identifies a thread to which the instruction belongs. The instruction identification (IID) identifies each instruction from others.

In addition, for the CSE 261A, 261B illustrated in FIG. 12, tables are prepared for each thread. Each table is associated with a thread number for identifying each thread. An entry of each of plural instructions belonging to each thread is registered in each table. Each entry of the CSE 261A, 261B includes: a processing flag (VAL); a bus use flag (MOVE_BUS_USE); and a D_MOVE flag (D_MOVE_COMP). When execution of processing is completed, "1" is set in the processing flag (VAL). When an instruction is an instruction opcode (OPCODE), d a SAVE instruction and a RESTORE instruction, "1" is set in the bus use flag (MOVE_BUS_USE). When D_MOVE processing starts, "1" is set in the D_MOVE flag (D_MOVE_COMP).

A portion of various kinds of information registered in these D_MOVE_STACK 241, the D_MOVE_ISSUE_SLOT 242 and the CSE 261A, 261B is registered in the decode control section 310 illustrated in FIG. 10.

The decode control section 310 illustrated in FIG. 10 includes the instruction cache section 210, the instruction input section 220 and the instruction decode section 230.

Figure 13:
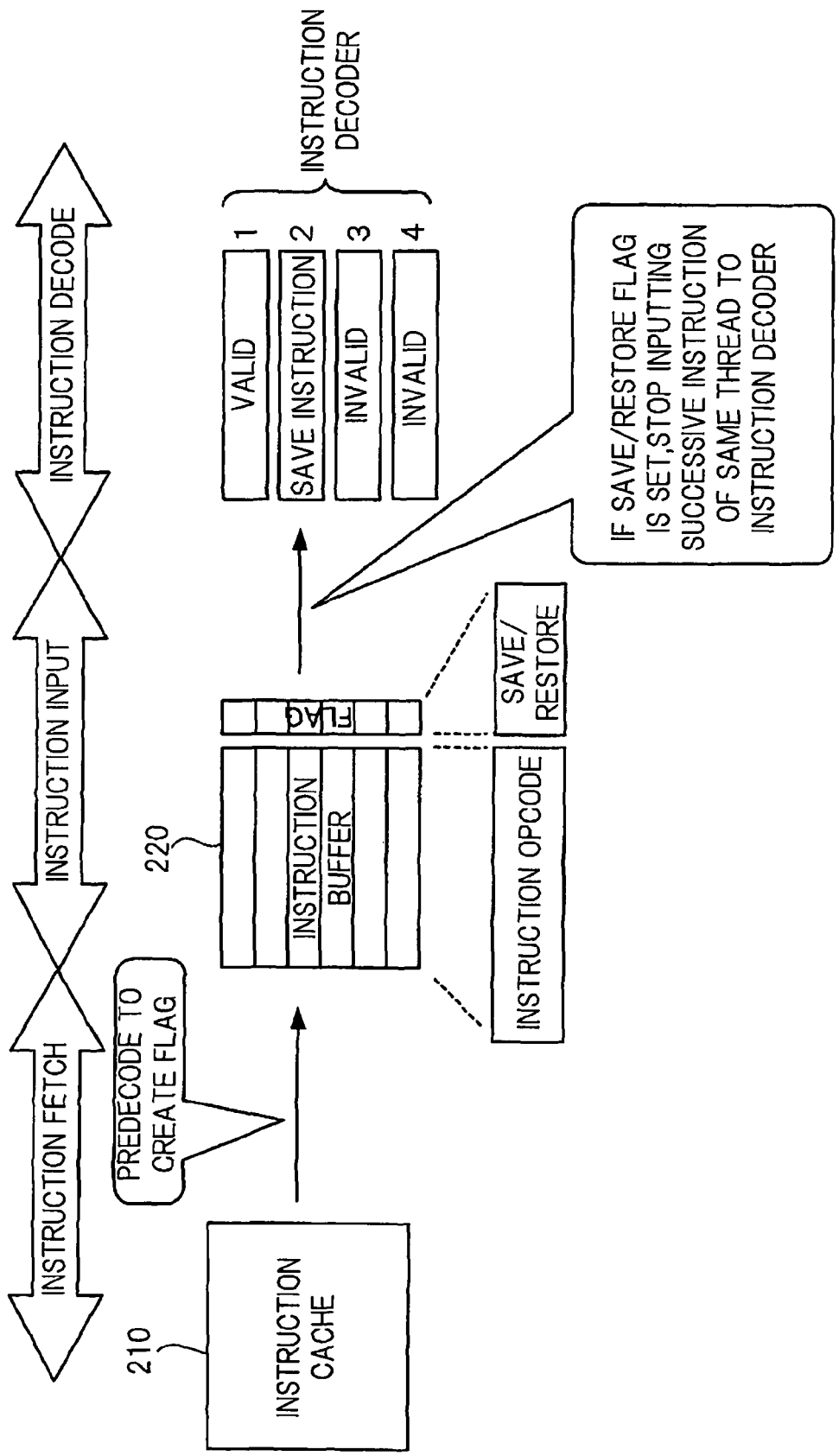
FIG. 13 is a diagram illustrating a flow of processing in a decode control section.

FIG. 13 is a diagram illustrating a flow of processing in the decode control section 310.

When an instruction belonging to each thread is issued, the instruction is cached in the instruction cache section 210, and the instruction is pre-decoded in the instruction input section 220 illustrated in FIG. 10. Then, whether or not the instruction is a SAVE instruction or a RESTORE instruction and a thread to which the instruction belongs are identified. Further, the instruction input section 220 stores the instruction in an instruction buffer 220' and also sets "1 (indicates a SAVE instruction or a RESTORE instruction)" in a flag prepared in advance in a case where the instruction is a SAVE instruction or a RESTORE instruction.

Further, in a case where a switching instruction is not registered in the D_MOVE_STACK 241, the instruction input section 220 inputs an instruction stored in the instruction buffer 220' to the instruction decode section 230.

In addition, in a case where a switching instruction is already registered in the D_MOVE_STACK 241, the instruction input section 220 acquires a thread identification (D_THREAD_ID) illustrated in FIG. 11 from the D_MOVE_STACK 241. If an instruction belonging to a same thread as that represented by the thread identification obtained is stored in the instruction buffer 220', the instruction input section 220 inhibits the instruction from being inputted to the instruction decode section 230. If an instruction belonging to a thread different from one represented by the thread identification (D_THREAD_ID) acquired is stored in the instruction buffer 220', the instruction input section 220 input the instruction first to the instruction decode section 230. An instruction which is stalled is inputted to the instruction decode section 230 after the switching instruction registered in the D_MOVE_STACK 241 is sent to the register file MOVE processing control section 330 and the stall is released.

The switching instruction which is stacked in the D_MOVE_STACK 241 is in standby until use of the D_MOVE bus 281 by other switching instruction is completed and permission to use the D_MOVE bus 281 is obtained. Therefore, when an instruction belonging to the same thread as that of a switching instruction in wait in the D_MOVE_STACK 241 is inputted to the instruction decode section 230, a subsequent instruction is inhibited (stall) from being executed until the preceding switching instruction is executed. Therefore, the instruction decode section 230 is occupied by the subsequent instruction and it becomes impossible to execute an instruction belonging to another thread. If an instruction belonging to the same thread as one of the instruction stacked in the D_MOVE_STACK 241 is stored in the instruction buffer 220', an instruction in an executable state may be executed first by inhibiting inputting the instruction to the instruction decode section 230 (stall) and by inputting an instruction belonging to a different thread to the instruction decode section 230, so that it is possible to speed up processing.

In the instruction decode section 230, the inputted instruction is decoded so that a thread number to which the instruction belongs, a kind of the instruction and the like are identified. In addition, in the instruction decode section 230, the instruction identification (IID) is attached to each instruction and at the same time "0: in process" (VAL) is set in a processing flag in an entry of the instruction of the CSE 261A, 261B associated with the thread number identified, and an instruction opcode (OPCODE) is set. If the instruction is a switching instruction (SAVE instruction or RTSOTRE instruction), "1" is set in the bus use flag (MOVE_BUS_USE).

When decoding of the instruction is completed, if the instruction is a normal calculation instruction other than a switching instruction, the calculation instruction is inputted to the computing unit 250 illustrated in FIG. 7, and processing according to the calculation instruction is executed in the computing unit 250. If the decoded instruction is a switching instruction, the instruction is inputted to the D_MOVE startup control section 320.

The MOVE startup control section 320 includes a stack section 240, a commit control section 260 and a trap/CWP update instruction detect section 280. The stack section 240 includes the D_MOVE_STACK 241 and the D_MOVE_ISSUE_SLOT 242. The commit control section 260 includes the CSE 261A, 261B and the instruction commit section 262 illustrated in FIG. 11. The trap/CWP update instruction detect section 280 issues the MOVE_ALL instruction to switch the CRB and the CWR.

In addition, if the instruction decoded in the instruction decode section 230 is a SAVE instruction to execute SAVE or a RESTORE instruction to execute RESTORE, the SAVE instruction or the RESTORE instruction is transmitted to the stack section 240.

Figure 14:
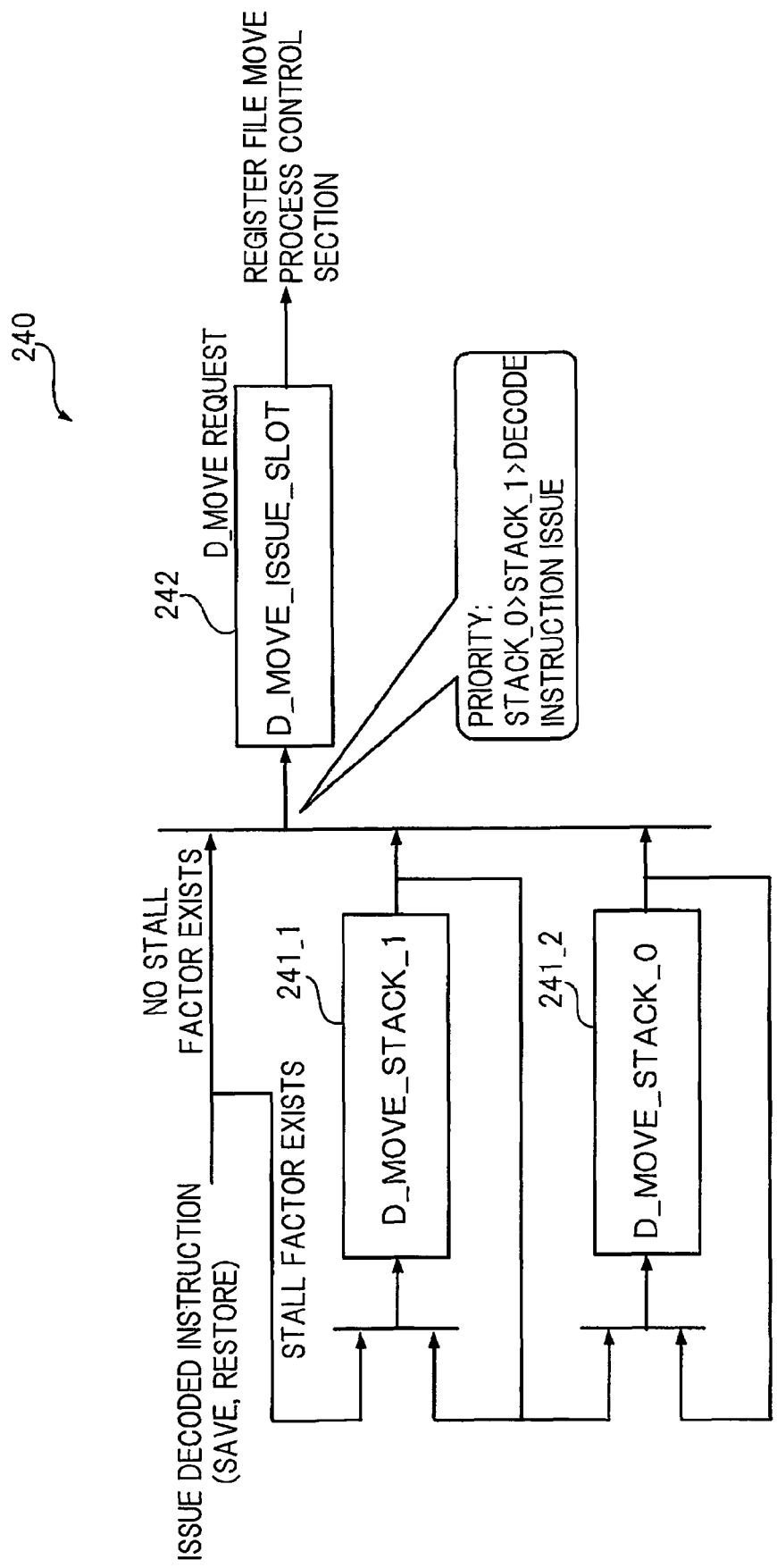
FIG. 14 is a block diagram of a stack section.

FIG. 14 is a block diagram of the stack section 240.

As illustrated in FIG. 14, the stack section 240 includes two of D_MOVE_STACKs 241_1, 242_2, the D_MOVE_ISSUE_SLOT 242, connecting lines connecting them, and a switch circuit to switch a switching instruction inputted from the instruction decode section 230 to each stack to store.

In a state where there is neither a preceding SAVE instruction nor a preceding RESTORE instruction that has not committed, there is no switching instruction that waits for a turn of data transferring from the MRF 271A, 271B to the CRB 272A, 272B illustrated in FIG. 10, so that CRB 272A, 272B are released and overwriting does not occur. Further, if the D_MOVE bus 281 is released and there is no stall factor, an instruction inputted to the stack section 240 is stored in the D_MOVE_ISSUE_SLOT 242. In the D_MOVE_ISSUE_SLOT 242, an instruction to execute D_MOVE processing is issued toward the register file MOVE processing control section 330 illustrated in FIG. 10.

Further, if there is a preceding SAVE instruction or a preceding RESTORE instruction that has not committed, the stored instruction indicates waiting for release of the CRB 272A, 272B, the CRB 272A, 272B are in use and data may be overwritten. If there is a stall factor in a state where the D_MOVE bus 281 is in use, the switching instruction inputted to the stack section 240 is once stored in the D_MOVE_STACK 241_1, 241_2. Incidentally, while the instruction is stored in the D_MOVE_SRACK 241_1, 241_2, because inputting of an instruction belonging to a same thread as that to which the instruction belongs is stalled, the instruction belonging to the same thread as that to which the instruction belongs is not stored in the D_MOVE_STACK 241_1, 241_2. In other words, at most one instruction for each of threads which are different from each other is stored in the D_MOVE_STACK 241_1, 241_2.

When the D_MOVE bus 281 is released, of the instructions stored in the D_MOVE_STACK 241_1, 241_2, an instruction of a thread whose overwriting of the CRB 272A, 272B is available first is first transferred to the D_MOVE_ISSUE_SLOT 242. In addition, if stall of the instructions stored in each of the D_MOVE_STACK 241_1, 241_2 are simultaneously released, an instruction that is stored first in the D_MOVE_STACK 241_1, 241_2 is transferred first to the D_MOVE_ISSUE_SLOT 242.

When the switching instruction is stored in the D_MOVE_ISSUE_SLOT 242, an instruction to execute the D_MOVE is issued toward the register file MOVE processing control section 330 illustrated in FIG. 10. In addition, when the instruction to execute the D_MOVE is issued from the D_MOVE_ISSUE_SLOT 242 to the MOVE processing control section 330, "1:D_MOVE start" is set in the D_MOVE_COMP flag of an entry corresponding to the switching instruction, of the CSE 261A, 261B.

The register file MOVE processing control section 330 includes a D_MOVE processing control section 331 and a W_MOVE processing control section 332.

The instruction to execute the D_MOVE processing issued from the D_MOVE_ISSUE_SLOT 242 and the instruction to execute the MOVE_ALL processing issued from the trap/CWP update instruction detect section 280 are transmitted to the D_MOVE processing control section 331. The D_MOVE processing control section 331 uses the D_MOVE bus 281 for each switching instruction to cause data to be transferred from the MRF 271A, 271B corresponding to a thread to which the switching instruction belongs to the CRB 272A, 272B.

Figure 15:
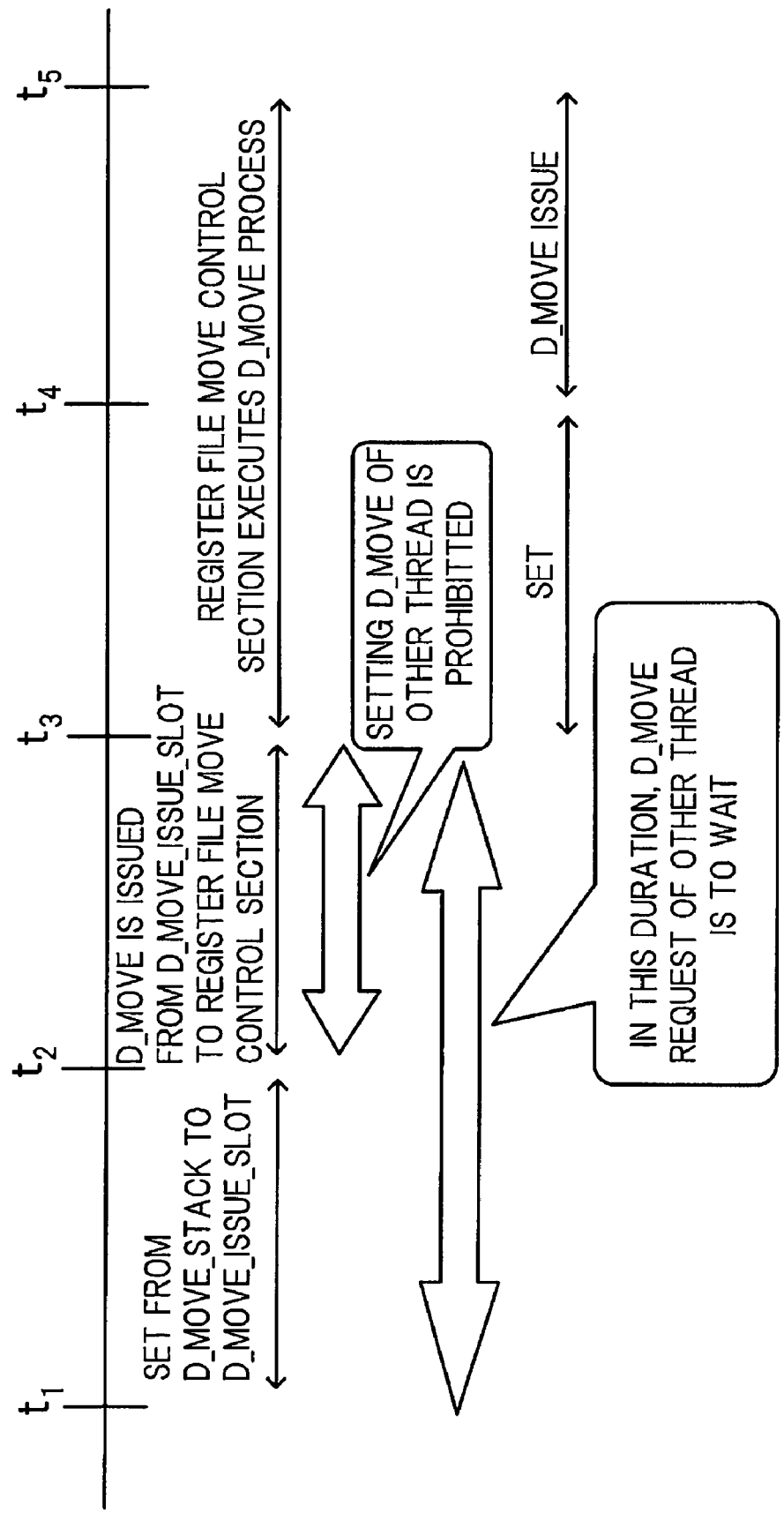
FIG. 15 is a diagram illustrating an execution timing of D_MOVE processing by a SAVE instruction and a RESTORE instruction.

FIG. 15 is a diagram illustrating an execution timing of the D_MOVE processing by a SAVE instruction or a RESTORE instruction. FIG. 15 illustrates a case in which a register of 16 words is transferred in two cycles register that (8 words per cycle) by the D_MOVE from the MRF 271A, 271B to the CRB 272A, 272B.

As illustrated in FIG. 15, a switching instruction inputted to the stack section 240 is set, after being directly or once stored in the D_MOVE_STACK 241_1, 2412, in the D_MOVE_ISSUE_SLOT 242 (cycle t1).

The preceding switching instruction is inputted in a next cycle t2 to the D_MOVE processing control section 331. Then, in a further next cycle t3, D_MOVE processing according to the preceding switching instruction is executed using the D_MOVE bus 281.

An instruction belonging to a different thread from one to which the preceding instruction belongs is in standby in the D_MOVE_STACK 241_1, 241_2 until the preceding instruction is inputted to the D_MOVE processing control section 331 and then the D_MOVE_ISSUE_SLOT 242 is released and the D_MOVE bus is released (cycle t2). An instruction belonging to a different thread from one to which the preceding instruction belongs is set in the D_MOVE_ISSUE_SLOT 242 in a cycle t31 and is inputted to the D_MOVE processing control section 331 (cycle t4). Because use of the D_MOVE bus 281 by the preceding instruction is supposed to be just completed in cycle t5, processing of a next D_MOVE is started without competing and a gap (cycle t5).

As explained, in this manner, by once storing the decoded instruction in the D_MOVE_STACK 241_1, 241_2 to control an order to input to the D_MOVE processing control section 331, it is possible to readily mediate competing of the D_MOVE bus 281.

When use of the D_MOVE bus 281 is permitted for the switching instruction, data of a target register window is transferred from the MRF 271A, 271B corresponding to a thread to which the switching instruction belongs through the D_MOVE bus 281 to the CRB 272A, 272B. As explained, when an instruction is decoded, data to be used by the instruction is transferred to the CRB 272A, 272B, data required for processing of an instruction after the switching instruction is read out from the CRB 272A, 272B, so that the instructions before and after the switching instruction are executed by out-of-order execution, and it is possible to reduce processing time.

In the above-described manner, processing of the D_MOVE is executed.

Next, processing of the W_MOVE processing of commit will be explained.

Firstly, processing of commit in a normal calculation process will be explained.

In the instruction decode section 230 illustrated in FIG. 8, when a calculation instruction to execute calculation processing is decoded, an entry of the calculation instruction is created in the CSE 261A, 261B corresponding to a thread to which the calculation instruction belongs, of the CSE 261A, 261B illustrated in FIG. 12. In addition, the calculation instruction decoded in the calculation decode section 230 is transmitted to the computing unit 250 and is executed in the computing unit 250. When calculation processing according to the calculation instruction is completed, "1:processed" is set in a processing flag (VAL) of an entry corresponding to the calculation instruction, of the CSE 261A, 261B.

The commit control section 260 of FIG. 10 monitors the processing flags (VAL) of the CSE 261A, 261B, and when all processing flags of plural instructions belonging to a same thread become all "1:processed", transmits those instructions to the instruction commit section 262.

In the instruction commit section 262, the plural instructions transmitted from the CSE 261A, 261B are committed in a predetermined program order, and an entry corresponding to a committed instruction is released.

Next, W_MOVE processing and commit processing by a SAVE instruction and a RESTORE instruction will be explained.

When a switching instruction (SAVE instruction, RESTORE instruction) is decoded in the decode section 230 of FIG. 8, an entry of the instruction is created in the CSE 261A, 261B corresponding to a thread to which the instruction belongs, of the CSE 261A, 261B illustrated in FIG. 12. In addition, the decoded instruction is stored in the D_MOVE_ISSUE_SLOT 242, and the above-described D_MOVE processing is executed. In the D_MOVE_ISSUE_SLOT 242, when the stored switching instruction is inputted to the D_MOVE processing control section 331, "1:

D_MOVE start" is set in a D_MOVE_COMP flag of an entry corresponding to the switching instruction, of the CSE 261A, 261B.

The commit control section 260 monitors execution timing of commit processing by confirming the D_MOVE_COMP flags of the CSE 261A, 261B.

Figure 16:
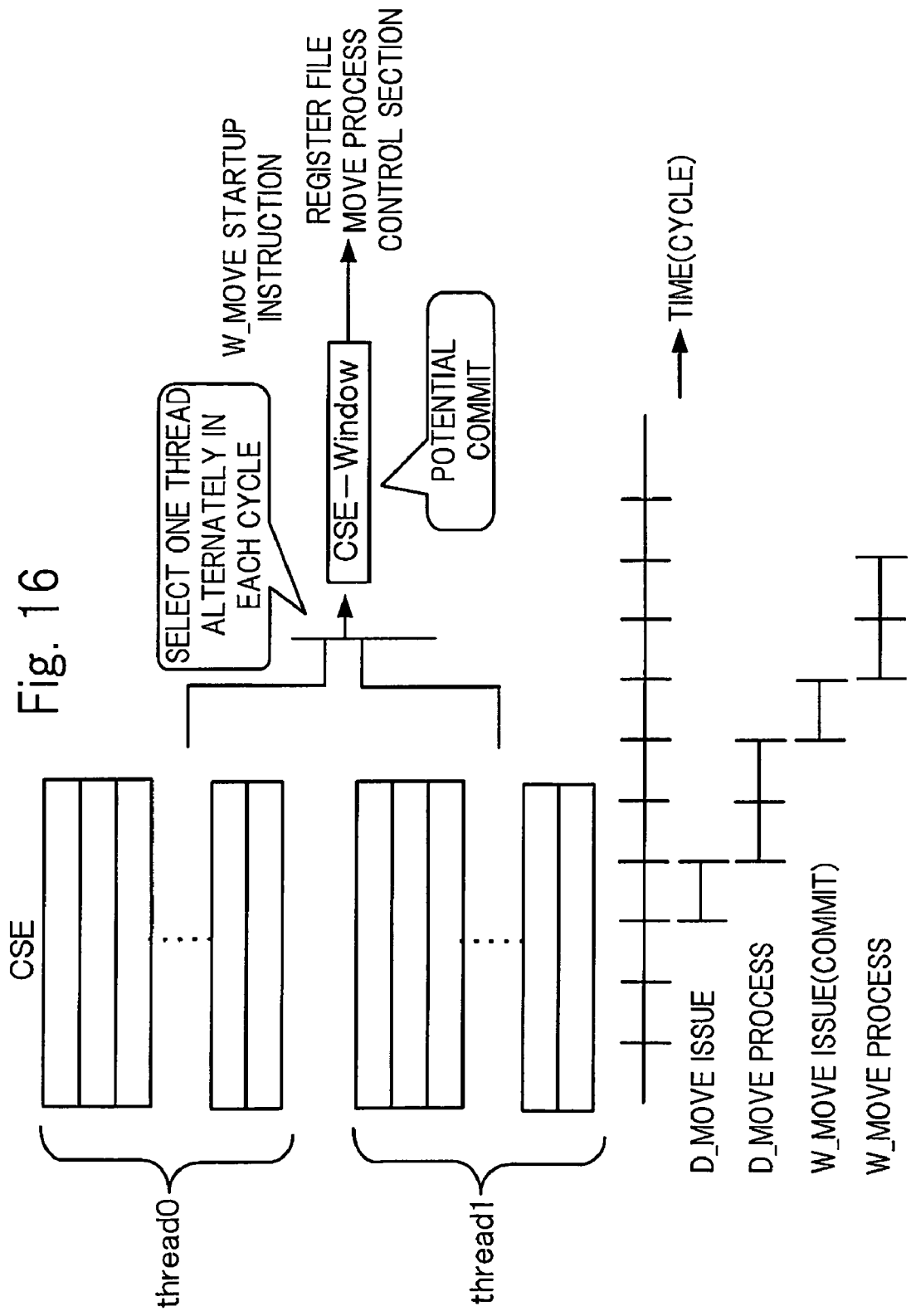
FIG. 16 is a diagram illustrating a flow of processing in a commit control section.

FIG. 16 is a diagram illustrating a flow of processing in the commit control section 260

The commit control section 260 monitors alternately the D_MOVE_COMP flags of the CSE 261A, 261B at each clock cycle, and when "1:D_MOVE start" is set in the D_MOVE_VOMP flag, acquires a thread number associated with the CSE 261A, 261B to which the entry belongs and sets the thread as a commit candidate.

Next, whether or not "1: processed" is set in the processing flag (VAL) of the entry corresponding to a preceding instruction belonging to the same thread of the CSE 261A, 261B after predetermined cycles (2 cycles in this embodiment) after the commit candidate is set and a use state of the W_MOVE bus 282 are checked. If all preceding instructions are completed in processing and the W_MOVE bus 282 is not in use, the commit control section 260 issues an instruction to execute W_MOVE processing toward the W_MOVE processing control section 332 of the register file MOVE processing control section 330 illustrated in FIG. 10, to perform commit of the SAVE instruction or the RESTORE instruction (W_MOVE processing).

If there exists a processing instruction not completed in processing or the W_MOVE bus 282 is used by another MOVE processing, after the CWR 273A, 273B and the W_MOVE bus 282 are released, an execution instruction of the W_MOVE processing is issued from the commit control section 260 toward the W_MOVE processing control section 332 and commit of the SAVE instruction and the RESTORE instruction (W_MOVE processing) is performed.

Upon receipt of the instruction to execute the W_MOVE processing, the W_MOVE processing control section 332 transfers data stored in the CWR 272A, 272B to the CRB 273A, 273B.

As illustrated in the lower part of FIG. 16, in the present embodiment, when an instruction to execute D_MOVE processing is issued from the D_MOVE_ISSUE_SLOT 240, while the D_MOVE processing is in process (2 cycles), the state is in commit waiting in the commit control section 260. Subsequently, if the W_MOVE bus 282 is released, commit is executed in the commit control section 260, and the W_MOVE processing is executed in the W_MOVE processing control section 332.

Figure 17:
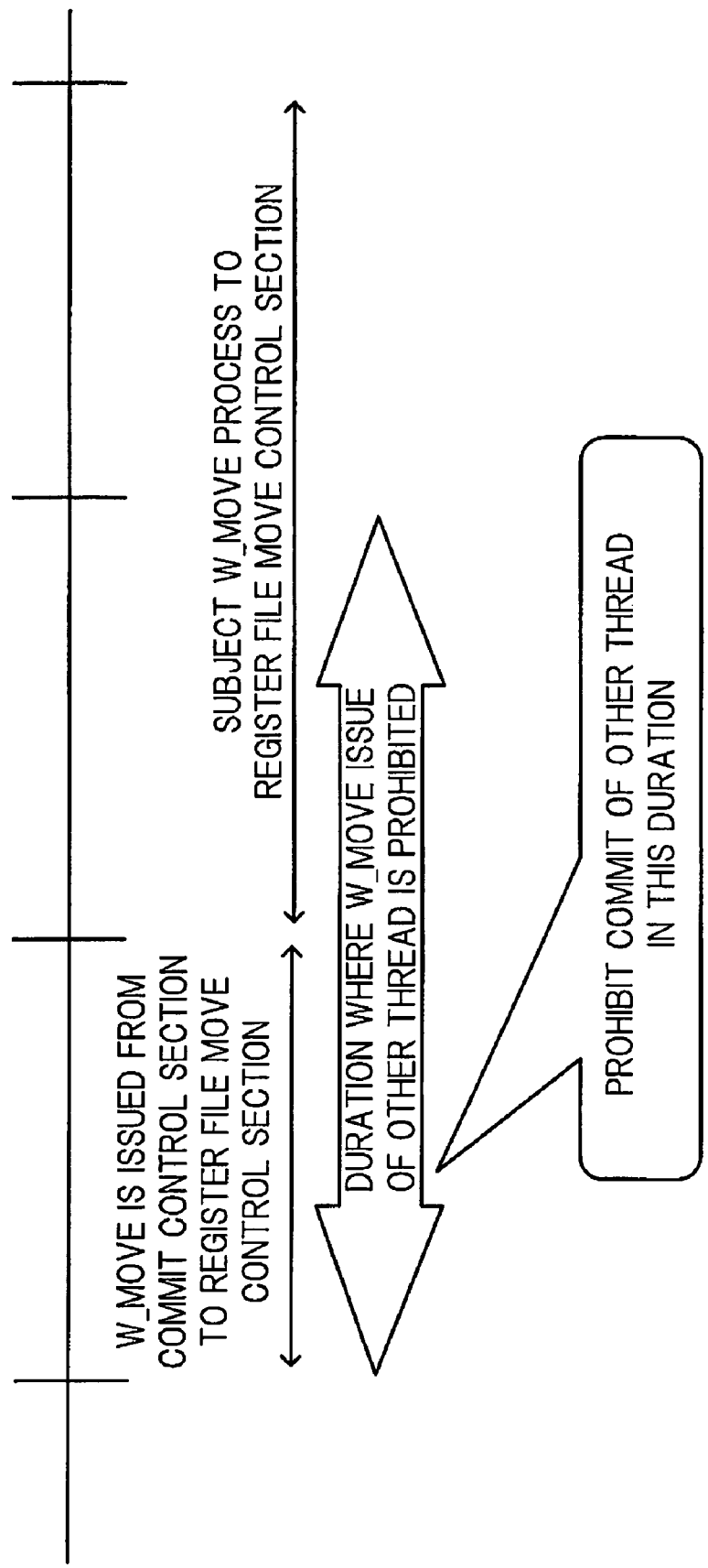
FIG. 17 is a diagram illustrating a flow of processing of W_MOVE processing.

FIG. 17 is a diagram illustrating a flow of the W_MOVE processing. FIG. 17 illustrates a case in which a register of 16 words is transferred from the CRB 272A, 272B to the WR 273A, 273B using 2 cycles (register of 8 words per 2 cycles) in the W_MOVE.

As illustrated in FIG. 17, when an instruction to execute W_MOVE processing is issued from the commit control section 260 toward the W_MOVE processing control section 332 of the register file MOVE processing control section 330, the W_MOVE is executed in the W_MOVE processing control section 332, commit of a switching instruction of another thread is inhibited by the commit control section 260 in 2 cycles after the instruction to execute the W_MOVE processing is issued (including the cycle in which the W_MOVE is issued), and issuing of an instruction to execute the W_MOVE processing is inhibited. On and after the third cycle after the instruction to execute W_MOVE processing is issued, commit of a subsequent switching instruction is permitted by the commit control section 269. Because it takes 1 cycle to issue an instruction to execute the W_MOVE processing in the switching instruction, and on and after the fourth cycle where actually the subsequent W_MOVE processing is executed, the W_MOVE processing is completed, it is possible to avoid competing of the W_MOVE bus 282.

Next, the MOVE_ALL processing by the CWP update instruction and the trap will be explained.

When a CWP update instruction is committed or a trap occurs, the fact is informed to the rap/CWP update instruction detect section 280, and a MOVE_ALL execution instruction (D_MOVE execution instruction+W_MOVE execution instruction) is issued from the trap/CWP update instruction detect section 280 toward the register file MOVE processing control section 330. The D_MOVE instruction control section 331 and the W_MOVE processing control section 332 execute the above-described D_MOVE processing and W_MOVE processing. Incidentally, for a case of CWP update instruction, decoding a subsequent instruction is stopped until the MOVE_ALL processing after the instruction commit is completed, and if a trap occurs, a subsequent instruction is all canceled from the pipeline, and further, decoding the subsequent instruction is stopped until the MOVE_ALL processing is completed.

FIG. 18 is a diagram illustrating a flow of the MOVE_ALL processing by the CWP update instruction or trap.

When an instruction to execute MOVE_ALL is issued from the trap/CWP update instruction detect section 280 toward the register file MOVE processing control section 330, the D_MOVE processing and the W_MOVE processing are executed. In this example, 32 words (referred to register in FIG. 2) included in one register window are transferred in four times separately for eight wards each. First, in the first transfer, data is transferred from the MRF 271A, 271B to the CRB 272A, 272B in the first cycle, and data is transferred from the CRB 272A, 272B to the CWR 273A, 273B in the second cycle. In the second transfer, the D_MOVE is executed in the second cycle in the first transfer, and the W_MOVE is executed in the third cycle in the first transfer. Subsequently, similarly, preceding W_MOVE and subsequent D_MOVE are executed in parallel by the pipeline.

Further, in a time interval until the last transfer is started after the instruction to execute MOVE_ALL is issued, issuing an instruction to execute D_MOVE by another switching instruction is prohibited, and in this interval in the D_MOVE_STACK is in waiting. Ina time interval until the W_MOVE in the last transfer is started after the instruction to execute MOVE_ALL is issued, issuing an instruction to execute W_MOVE by another switching instruction is prohibited. This is controlled by inhibiting commit in the commit control section in this time interval. In this manner, it is possible to mediate the D_MOVE bus 281 and W_MOVE bus 282.

Lastly, an entire flow of the processing will be explained using a concrete switching processing example.

FIG. 19 is a diagram illustrating a timing of data transfer in switch processing.

FIG. 19 illustrates an execution timing of each switching instruction in a case where a first SAVE instruction belonging to a first thread 0, a second SAVE instruction belonging to the first thread 0 and a third SAVE instruction belonging to a second thread 1 are sequentially issued.

When the first SAVE instruction belonging to the first thread 0 is issued, the first SAVE instruction is decoded and then stored in the D_MOVE_ISSUE_SLOT 242, and data is transferred from the MRF 271A (GPR mask) to the CRB 272A using the D_MOVE bus 282 (D_MOVE). Due to this, the CRB 272A is in use by the first SAVE instruction. Concretely, data of the CRB 272A is used to execute a subsequent instruction of the first SAVE instruction by out-of-order execution.

The second SAVE instruction belonging to the first thread 0 is, after decoded, stored in the D_MOVE_STACK 241. The second SAVE instruction is in a stall state in the D_MOVE_STACK 241_1, 241_2 until the CRB 272A is released by the first SAVE instruction belonging to the same thread.

In contrast, the third SAVE instruction belonging to the second thread 1 does not need to wait release of the CRB 272A by the first SAVE instruction, and when use of the D_MOVE bus 281 is permitted, the third SAVE instruction is stored in the D_MOVE_ISSUE_SLOT 242 before the second SAVE instruction. Then, data is transferred from the MRF 271B to the CRB 272B using the D_MOVE bus 281 (D_MOVE).

When processing of the instruction belonging to the first thread 0 is completed, and after use of the CWR 273A is completed and then the CWR 273A is released, data is transferred from the CRB 272A to the CWR 273A by the first SAVE instruction belonging to the first thread 0 and then the CRB 272A is released. As a result, stall in the second SAVE instruction is released.

When the stall is released, competing between the third SAVE instruction and the D_MOVE bus 281 is mediated in the D_MOVE_STACK 2411, 2412, the second SAVE instruction is stored in the D_MOVE_ISSUE_SLOT 242 and the D_MOVE is executed.

By inhibiting storing plural switching instructions belonging to a same thread into the D_MOVE_STACK, it is possible to avoid a failure in which those plural switching instructions are simultaneously executed and data of the CRB 272A, 272B and the CWP 273A, 273B which are in use is overwritten. And further, by controlling an input order of instructions stacked in the D_MOVE_STACK into the D_MOVE processing control section 331, it is possible to readily mediate the D_MOVE bus 281 and a second bus.

As explained, in the present embodiment, it is possible to obtain simultaneous multithreading while suppressing cost increasing and size increasing of the apparatus.

Here, in the above explanation, the example of instruction processing apparatus to execute two threads simultaneously is explained. However, the instruction processing apparatus (according to the invention) may be one in which three or more threads are simultaneously executed.

Further, in the above explanations, the example in which the instruction processing apparatus according to the invention is applied to a CPU of a personal computer is explained. However, the instruction processing apparatus according to the invention may be, for example, a CPU of a server apparatus.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A instruction processing apparatus, comprising:
a thread execution processing section that executes threads each including a plurality of instructions;
a register file of a plurality of register files that includes a register window including a plurality of registers and is provided individually for each thread;
a current window pointer that is provided individually for the thread and indicates a position of the register where the register window is possible to be inputted and outputted;
a current register that is provided individually for the thread and reads out data held by the register window designated by the current window pointer from the register file to hold the data;
a replacement buffer of a plurality of replacement buffers that is provided individually for each thread and holds data which is transferred from the register file to the current register;
a first transfer path that transfers data in a register file selected from the plurality of register files to one of the plurality of replacement buffers;
a second data transfer path that transfers data in a replacement buffer selected form the plurality of the replacement buffers to one of the plurality of current registers;
a calculation section that is provided individually for the thread and executes a switching instruction of the register window;
a control section that controls, if the calculation section executes the switching instruction included in the one of the plurality of threads, the first data transfer path and the second data transfer path, corresponding to the thread including the switching instruction;
a decode section that decodes the instruction; and
an execution section that executes an instruction other than the switching instruction which the calculation section executes, of the instructions decoded in the decode section and is capable of executing a plurality of instructions simultaneously, wherein the calculation section transfers, if the switching instruction is decoded by the decode section, the data to the replacement buffer, and transfers, if all the instructions to be completed before the switching instruction is completed are completed, the data to the current register.

2. The instruction processing apparatus according to claim 1, wherein the calculation section obtains information to identify the thread to which the switching instruction belongs from other thread and switches the register window corresponding to the thread identified by the information.

3. The instruction processing apparatus according to claim 1, wherein
the decode section decodes the instruction of each of the plurality of threads at one time with respect to one of the plurality of threads, and
the execution section is capable of executing simultaneously a plurality of instructions included in the threads which are different from each other.

4. The instruction processing apparatus according to claim 1, wherein
the calculation section receives the switching instruction which has been decoded by the decode section and transfers the data to the replacement buffer, and
the calculation processing apparatus further comprises a switching instruction stack that receives, if the switching instruction is decoded by the decode section and there is an instruction which has not been completed and which is to be completed before the switching instruction, the switching instruction before being sent to the calculation section from the decode section to hold the received instruction.

5. The instruction processing apparatus according to claim 4, wherein
the switching instruction stack is capable of holding a plurality of the switching instructions, and
the control section controls the first data transfer path and the second data transfer path by sending one by one the switching instructions held by the switching instruction stack to the calculation section.

6. The instruction processing apparatus according to claim 5, wherein the control section sends to the calculation section first, the switching instruction where all the instructions to be completed before the switching instruction are completed first, of the switching instructions held by the switching instruction stack.

7. The instruction processing apparatus according to claim 5, wherein
the control section sends first, if all the instructions to be completed before the switching instructions are completed simultaneously with respect to the plurality of switching instructions held by the switching instruction stack, the switching instruction which is held first by the switching instruction stack of the plurality of switching instructions.

8. The instruction processing apparatus according to claim 4, wherein
the switching instruction stack also holds, associating with the switching instruction, a thread identifier to identify the thread to which the switching instruction belongs from the other thread, and
an instruction identifier to identify the switching instruction from the other instruction being in execution in the instruction processing apparatus.

9. The instruction processing apparatus according to claim 4, further comprising an instruction input section that obtains the instruction from each of the plurality of threads to input the inputted instruction to the decode section, and stops, if the switching instruction is held in the switching instruction stack, inputting the instruction with respect to the thread to which the switching instruction belongs, and inputs the instruction belonging to the other thread.

10. The instruction processing apparatus according to claim 1, wherein
the decode section simultaneously holds a plurality of the instructions and decodes the plurality of the instructions which the decode section holds, and the instruction processing apparatus further comprises:
a pre-decode section that confirms, before the decode section, whether or not the instruction is the switching instruction by decoding which is simpler than decoding of the instruction by the decode section; and
an instruction input section that obtains the instruction from each of the plurality of threads and inputs the obtained instruction to the decode section, and adjusts an input timing such that at most one instruction which is confirmed to be the switching instruction by the pre-decode section is held at one time by the decode section.

* * * * *